(12) United States Patent
Ushiyama et al.

(10) Patent No.: US 11,840,101 B2
(45) Date of Patent: Dec. 12, 2023

(54) PRINTING APPARATUS AND METHOD FOR CONTROLLING THE SAME

(71) Applicant: CANON KABUSHIKI KAISHA, Tokyo (JP)

(72) Inventors: Takayuki Ushiyama, Chiba (JP); Hidehiko Kanda, Kanagawa (JP); Keiji Kuriyama, Saitama (JP); Akihiro Tomida, Kanagawa (JP); Takeshi Yazawa, Kanagawa (JP); Yoshinori Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 17/825,011

(22) Filed: May 26, 2022

(65) Prior Publication Data

US 2022/0379642 A1    Dec. 1, 2022

(30) Foreign Application Priority Data

Jun. 1, 2021    (JP) ................. 2021-092145

(51) Int. Cl.
| | |
|---|---|
| *B41J 29/393* | (2006.01) |
| *G06K 15/02* | (2006.01) |
| *G06K 15/10* | (2006.01) |
| *B41J 2/21* | (2006.01) |

(52) U.S. Cl.
CPC ........... *B41J 29/393* (2013.01); *B41J 2/2114* (2013.01); *B41J 2/2135* (2013.01); *G06K 15/027* (2013.01); *G06K 15/102* (2013.01); *B41J 2029/3935* (2013.01)

(58) Field of Classification Search
CPC ...... B41J 29/393; B41J 2/2114; B41J 2/2135; B41J 2029/3935
See application file for complete search history.

(56) References Cited

U.S. PATENT DOCUMENTS

| | | |
|---|---|---|
| 5,825,377 A | 10/1998 | Gotoh et al. |
| 5,949,447 A | 9/1999 | Arai et al. |
| 5,980,012 A | 11/1999 | Fujita et al. |
| 6,027,196 A | 2/2000 | Gotoh et al. |
| 6,109,720 A | 8/2000 | Gotoh et al. |
| 6,113,210 A | 9/2000 | Gotoh et al. |
| 6,120,129 A | 9/2000 | Iwasaki et al. |

(Continued)

FOREIGN PATENT DOCUMENTS

JP    2001138494 A    5/2001

*Primary Examiner* — Julian D Huffman
(74) *Attorney, Agent, or Firm* — Venable LLP

(57) ABSTRACT

A plurality of test patterns are printed with different print conditions, the test patterns each being formed by two inks out of a plurality of inks and a reaction liquid and including a plurality of patterns among which ejection positions of the reaction liquid relative to ejection positions of the two inks are displaced by a predetermined amount at a time. The optical properties of the respective test patterns printed on the print medium are detected. A displacement amount of the relative ejection positions of the reaction liquid from the ejection positions of the plurality of inks is obtained based on the optical property of the test pattern in which an optical density difference between the patterns in the test pattern is greater than a predetermined value and which has an optical density of a lowest level among the optical properties of the test patterns detected.

19 Claims, 15 Drawing Sheets

(56) References Cited

U.S. PATENT DOCUMENTS

| | | | |
|---|---|---|---|
| 6,142,600 A | 11/2000 | Takahashi et al. | |
| 6,145,950 A | 11/2000 | Ohtsuka et al. | |
| 6,244,681 B1 | 6/2001 | Yano et al. | |
| 6,260,938 B1 | 7/2001 | Ohtsuka et al. | |
| 6,435,639 B1 | 8/2002 | Nakajima et al. | |
| 6,543,872 B2 | 4/2003 | Ohtsuka et al. | |
| 6,543,892 B2 | 4/2003 | Kubota et al. | |
| 6,601,938 B1 | 8/2003 | Iwasaki et al. | |
| 6,631,972 B2 | 10/2003 | Yazawa | |
| 6,712,443 B2 | 3/2004 | Kanda et al. | |
| 6,764,154 B2 | 7/2004 | Nishikori et al. | |
| 6,857,718 B2 | 2/2005 | Moriyama et al. | |
| 6,877,833 B2 | 4/2005 | Teshigawara et al. | |
| 6,913,337 B2 | 7/2005 | Kuronuma et al. | |
| 6,921,218 B2 | 7/2005 | Moriyama et al. | |
| 6,945,623 B2 | 9/2005 | Sakamoto et al. | |
| 6,957,879 B2 | 10/2005 | Moriyama et al. | |
| 6,966,629 B2 | 11/2005 | Nakajima et al. | |
| 6,991,316 B2 | 1/2006 | Maru et al. | |
| 7,052,191 B2 | 5/2006 | Moriyama et al. | |
| 7,080,892 B2 | 7/2006 | Moriyama et al. | |
| 7,090,332 B2 | 8/2006 | Konno et al. | |
| 7,101,004 B2 | 9/2006 | Sakamoto et al. | |
| 7,144,093 B2 | 12/2006 | Nakajima et al. | |
| 7,185,964 B2 | 3/2007 | Kanda et al. | |
| 7,258,412 B2 | 8/2007 | Maru et al. | |
| 7,261,387 B2 | 8/2007 | Nishikori et al. | |
| 7,287,830 B2 | 10/2007 | Ide et al. | |
| 7,290,855 B2 | 11/2007 | Chikuma et al. | |
| 7,296,872 B2 | 11/2007 | Hayashi et al. | |
| 7,296,877 B2 | 11/2007 | Chikuma et al. | |
| 7,303,247 B2 | 12/2007 | Maru et al. | |
| 7,315,393 B2 | 1/2008 | Kanda et al. | |
| 7,325,900 B2 | 2/2008 | Hayashi et al. | |
| 7,328,963 B2 | 2/2008 | Tajika et al. | |
| 7,344,219 B2 | 3/2008 | Sakamoto et al. | |
| 7,354,133 B2 | 4/2008 | Ide et al. | |
| 7,408,676 B2 | 8/2008 | Yazawa et al. | |
| 7,515,318 B2 | 4/2009 | Nishikori et al. | |
| 7,520,582 B2 * | 4/2009 | Konno | B41J 2/2114 347/14 |
| 7,533,962 B2 | 5/2009 | Masuyama et al. | |
| 7,537,310 B2 | 5/2009 | Konno et al. | |
| 7,651,194 B2 | 1/2010 | Yazawa et al. | |
| 7,706,023 B2 | 4/2010 | Kanda et al. | |
| 7,758,153 B2 | 7/2010 | Tanaka et al. | |
| 7,762,640 B2 | 7/2010 | Kanda et al. | |
| 7,782,350 B2 | 8/2010 | Tanaka et al. | |
| 7,789,476 B2 | 9/2010 | Tomida et al. | |
| 7,850,273 B2 | 12/2010 | Yasutani et al. | |
| 7,862,149 B2 | 1/2011 | Yasutani et al. | |
| 7,903,280 B2 | 3/2011 | Yazawa et al. | |
| 7,980,649 B2 | 7/2011 | Konno et al. | |
| 7,980,652 B2 | 7/2011 | Baba et al. | |
| 7,980,672 B2 | 7/2011 | Umezawa et al. | |
| 8,038,253 B2 | 10/2011 | Ide et al. | |
| 8,057,009 B2 | 11/2011 | Tomida et al. | |
| 8,079,659 B2 | 12/2011 | Tajika et al. | |
| 8,164,789 B2 | 4/2012 | Nishikori et al. | |
| 8,186,783 B2 | 5/2012 | Yasutani et al. | |
| 8,251,473 B2 | 8/2012 | Moriyama et al. | |
| 8,251,479 B2 | 8/2012 | Seki et al. | |
| 8,251,480 B2 | 8/2012 | Moriyama et al. | |
| 8,251,482 B1 | 8/2012 | Yasutani et al. | |
| 8,342,649 B2 | 1/2013 | Yazawa et al. | |
| 8,384,944 B2 | 2/2013 | Kawatoko et al. | |
| 8,439,472 B2 | 5/2013 | Yasutani et al. | |
| 8,511,787 B2 | 8/2013 | Yasutani et al. | |
| 8,511,799 B2 | 8/2013 | Harigai et al. | |
| 8,517,490 B2 | 8/2013 | Kanematsu et al. | |
| 8,579,401 B2 | 11/2013 | Iritani et al. | |
| 8,608,277 B2 | 12/2013 | Tomida et al. | |
| 8,622,501 B2 | 1/2014 | Komamiya et al. | |
| 8,636,334 B2 | 1/2014 | Nishioka et al. | |
| 8,721,021 B2 | 5/2014 | Nakajima et al. | |
| 8,786,896 B2 | 7/2014 | Marumoto et al. | |
| 8,882,228 B2 | 11/2014 | Ojiro et al. | |
| 8,888,223 B2 | 11/2014 | Oonuki et al. | |
| 8,939,540 B2 | 1/2015 | Fletcher et al. | |
| 9,007,653 B2 | 4/2015 | Ojiro et al. | |
| 9,010,896 B2 | 4/2015 | Tomida | |
| 9,120,304 B2 | 9/2015 | Konno et al. | |
| 9,126,403 B2 | 9/2015 | Ojiro et al. | |
| 9,211,748 B2 | 12/2015 | Baba et al. | |
| 9,227,423 B2 | 1/2016 | Yazawa et al. | |
| 9,545,791 B2 | 1/2017 | Oonuki et al. | |
| 9,573,381 B2 | 2/2017 | Kanda et al. | |
| 10,668,717 B2 | 6/2020 | Azuma et al. | |
| 11,077,687 B2 | 8/2021 | Nishioka et al. | |
| 11,383,536 B2 | 7/2022 | Genta et al. | |
| 2009/0079777 A1 | 3/2009 | Nagamura et al. | |
| 2014/0375717 A1 | 12/2014 | Yazawa et al. | |
| 2018/0326741 A1 * | 11/2018 | Watanabe | B41M 5/0017 |
| 2020/0247163 A1 * | 8/2020 | Baba | B41J 29/393 |
| 2022/0001666 A1 | 1/2022 | Kuriyama et al. | |
| 2022/0080747 A1 | 3/2022 | Kato et al. | |

* cited by examiner

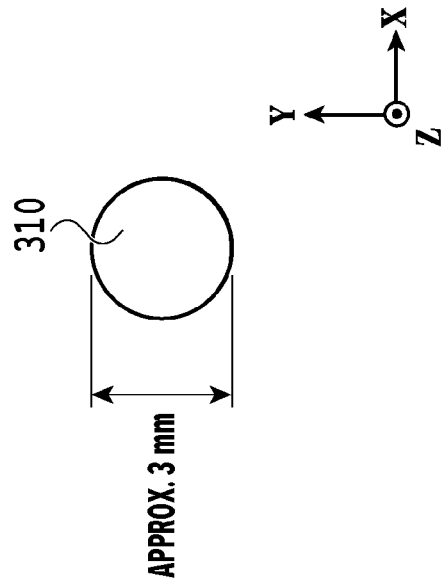
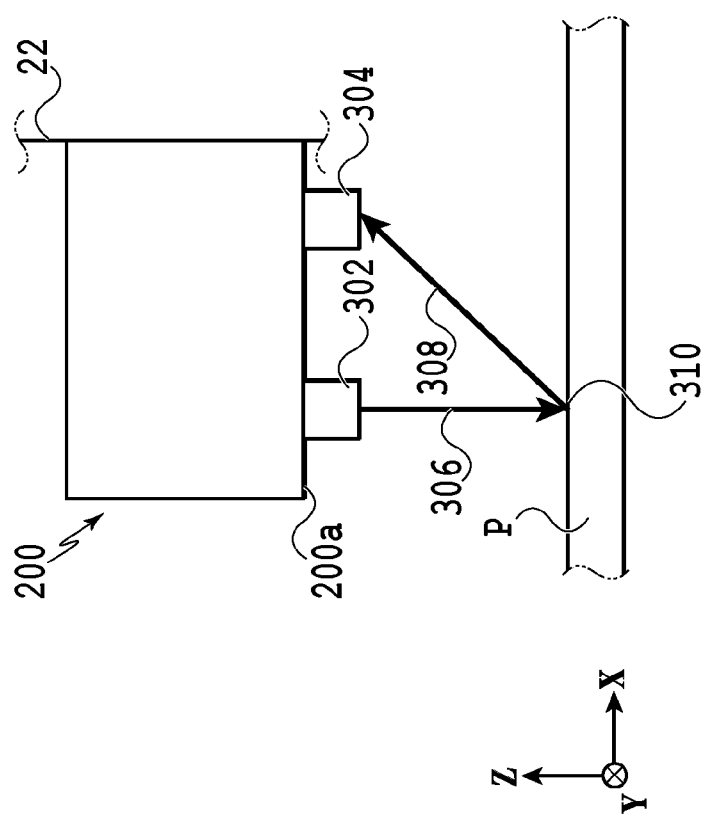

PRINTING APPARATUS AND METHOD FOR CONTROLLING THE SAME

BACKGROUND OF THE INVENTION

Field of the Invention

The present invention relates to a printing apparatus that performs printing by fixating ink onto a print medium using a reaction liquid that reacts with the ink and a method for controlling the printing apparatus.

Description of the Related Art

Japanese Patent Laid-Open No. 2001-138494 discloses a technique to use for a printing apparatus that ejects, toward ejected ink, a reaction liquid that reacts with the ink, the technique being for obtaining a displacement amount of the ejection positions of the reaction liquid from the ejection positions of the ink. Specifically, a plurality of patterns are used which are different in their amounts by which the ejection positions of the reaction liquid are displaced from a pattern where two inks come into contact on a print medium and smear into one another. Then, based on the optical properties of the patterns with different degrees of smearing depending on the displacement amounts, a displacement amount between the ejection positions of the inks and the ejection positions of the reaction liquid is obtained.

A printing apparatus is required to be able to perform printing on various types of print media with different ink absorbencies. Print media with different ink absorbencies differ in their degree of smearing caused by a contact between different types of ink. Thus, with the technique disclosed by Japanese Patent Laid-Open No. 2001-138494, even in a case where a pattern for forming smearing suitable for obtaining a displacement amount of the ejection positions of the reaction liquid from the ejection positions of the inks is used, the displacement amount may not be obtained accurately for a particular medium.

SUMMARY OF THE INVENTION

The present invention has been made in view of the above problem and provides a technique with which a displacement amount of the ejection positions of a reaction liquid from the ejection positions of inks can be obtained accurately for various types of print media.

In the first aspect of the present invention, there is provided a printing apparatus including:

a print unit configured to print an image on a print medium by ejecting, to the print medium, a plurality of inks different from one another and a reaction liquid that reacts with the inks to promote solidification of the inks;

a detection unit configured to be able to detect an optical density of a printed product obtained by the printing of the image on the print medium; and an obtainment unit configured to obtain a displacement amount of relative ejection positions of the reaction liquid from ejection positions of the plurality of inks, wherein the print unit prints a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time, the detection unit detects optical properties of the plurality of test patterns printed on the print medium, and the obtainment unit obtains the displacement amount based on the optical property of the test pattern in which an optical density difference between the patterns in the test pattern is greater than a predetermined value and which has an optical density of a lowest level among the optical properties of the plurality of test patterns detected by the detection unit.

In the second aspect of the present invention, there is provided a printing apparatus including:

a print unit configured to print an image on a print medium by ejecting, to the print medium, a plurality of inks different from one another and a reaction liquid that reacts with the inks to promote solidification of the inks;

a detection unit configured to be able to detect an optical density of a printed product obtained by the printing of the image on the print medium; and an obtainment unit configured to obtain a displacement amount of relative ejection positions of the reaction liquid from ejection positions of the plurality of inks, wherein the print unit prints one of a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time, the detection unit detects an optical property of the test pattern printed on the print medium, in a case where the optical property of the test pattern detected by the detection unit indicates that an optical density difference between the patterns in the test pattern is greater than a predetermined value and that the test pattern has an optical density of a lowest level, the obtainment unit obtains the displacement amount based on the optical property, and in a case where the optical property of the test pattern detected by the detection unit does not indicate that the optical density difference between the patterns in the test pattern is greater than the predetermined value and that the test pattern has an optical density of a lowest level, the print unit prints one of the plurality of test patterns which is yet to be printed, and the detection unit detects an optical property of the test pattern printed.

In the third aspect of the present invention, there is provided a printing apparatus including:

a print unit configured to print an image on a print medium by ejecting, to the print medium, a plurality of inks different from one another and a reaction liquid that reacts with the inks to promote solidification of the inks;

a detection unit configured to be able to detect an optical density of a printed product obtained by the printing of the image on the print medium; and an obtainment unit configured to obtain a displacement amount of relative ejection positions of the reaction liquid from ejection positions of the plurality of inks, wherein the print unit prints one of a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time, the one test pattern being associated with the print medium to be printed and indicating that, in a case where the test pattern is printed, an optical density difference between the patterns in the test pattern is greater than a predetermined value and that the test pattern has an optical density of a lowest level, the detection unit detects an optical property of the test pattern printed on the print medium, and the obtainment unit obtains the displacement amount based on the optical property of the test pattern detected by the detection unit.

In the forth aspect of the present invention, there is provided a printing apparatus including:

a print unit configured to print an image on a print medium by ejecting, to the print medium, a plurality of inks different from one another and a reaction liquid that reacts with the inks to promote solidification of the inks;

a detection unit configured to be able to detect an optical density of a printed product obtained by the printing of the image on the print medium; and an obtainment unit configured to obtain a displacement amount of relative ejection positions of the reaction liquid from ejection positions of the plurality of inks, wherein the print unit is capable of printing a plurality of test patterns with different print conditions and a plurality of property representing patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time, the property representing patterns each including a plurality of patterns that use at least the two inks of the two inks and the reaction liquid and representing a property of the print medium, the print unit prints one of the plurality of test patterns with the different print conditions, the one test pattern being selected based on optical properties of the plurality of printed property representing patterns different from one another that are detected by the detection unit, the one test pattern indicating that, in a case where the test pattern is printed, an optical density difference between the patterns in the test pattern is greater than a predetermined value and that the test pattern has an optical density of a lowest level, and the obtainment unit obtains the displacement amount based on an optical property of the test pattern detected by the detection unit.

In the fifth aspect of the present invention, there is provided a method for controlling a printing apparatus including a print unit configured to print an image on a print medium by ejecting, to the print medium, a plurality of inks different from one another and a reaction liquid that reacts with the inks to promote solidification of the inks, and a detection unit configured to be able to detect an optical property of a printed product obtained by the printing of the image on the print medium, the method including:

causing the print unit to print a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time;

causing the detection unit to detect optical properties of the respective test patterns printed; and obtaining a displacement amount of relative ejection positions of the reaction liquid from ejection positions of the plurality of inks based on the optical property of the test pattern in which an optical density difference between the patterns in the test pattern is greater than a predetermined value and which has an optical density of a lowest level among the optical properties of the plurality of test patterns detected.

The present invention allows a displacement amount of the ejection positions of a reaction liquid from the ejection positions of inks to be obtained accurately for various types of print media.

Further features of the present invention will become apparent from the following description of exemplary embodiments with reference to the attached drawings.

BRIEF DESCRIPTION OF THE DRAWINGS

FIGS. 3A and 3B are schematic configuration diagrams of an optical sensor;

DESCRIPTION OF THE EMBODIMENTS

With reference to the drawings attached hereto, example embodiments of a printing apparatus and a method for controlling the same are described in detail below. Note that the following embodiments are not intended to limit the present invention, and not all the combinations of the features described in the embodiments are necessarily essential to the solutions provided by the present invention. Also, the relative positions, shapes, and the like of the configurations described in the embodiments are mere examples, and the scope of the present invention is not limited only to them.

As an example, the following description uses a printing apparatus using an inkjet printing method. The printing apparatus may be, for example, a single-function printer having only a printing function or a multi-function printer having a plurality of functions such as a printing function, a facsimile function, and a scanner function. Alternatively, the printing apparatus may be a manufacturing apparatus that uses a predetermined printing method to manufacture color filters, electronic devices, optical devices, micro structures, or the like.

Also, "printing" includes not only forming meaningful information such as text and drawings, but also forming meaningless information. Further, "printing" is not limited to visualizing information so that a human can be visually sense it, and widely includes forming an image, a design, a pattern, a structure, or the like on a print medium, or processing a medium. A "print medium" includes not only paper commonly used in printing apparatuses, but also other ink-receivable media, such as fabric, a plastic film, a metal plate, glass, ceramics, resins, wood, and leather.

First Embodiment

First, with reference to FIGS. 1 to 12B, a description is given of a printing apparatus of a first embodiment. The printing apparatus of the present embodiment is what is called a serial scan type inkjet printing apparatus that uses the inkjet method and ejects inks to a print medium being conveyed while moving in a direction intersecting with a conveyance direction.

<Configuration of the Printing Apparatus>

Figure 1:
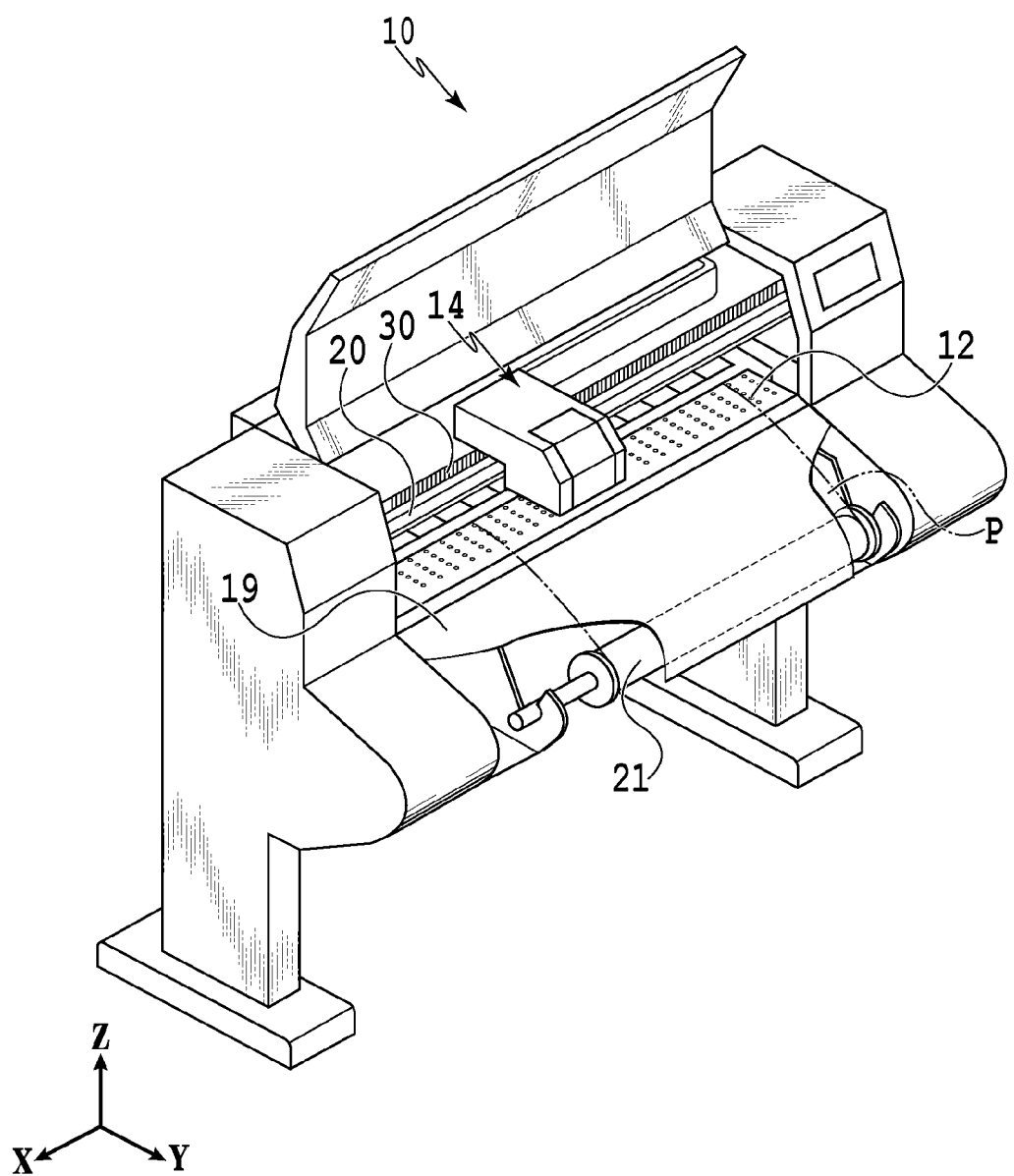
FIG. 1 is a schematic configuration diagram of a printing apparatus of an embodiment.
Figure 2:
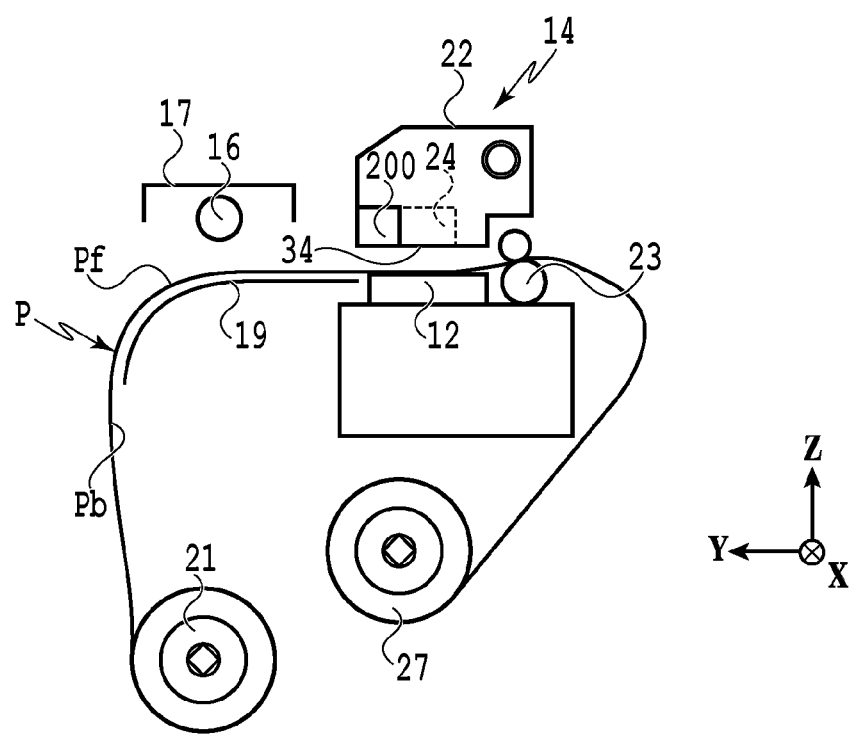
FIG. 2 is a schematic configuration diagram of a main part of the printing apparatus in FIG. 1.

FIG. 1 is a schematic configuration diagram of the printing apparatus of the embodiment. FIG. 2 is a diagram illustrating a heater part in the printing apparatus. A printing apparatus 10 in FIG. 1 includes a platen 12 that supports a print medium P conveyed by a conveyance part (not shown) and a print part 14 that performs printing on the print medium P supported by the platen 12. The printing apparatus 10 also includes a heater part 16 (see FIG. 2) that heats a printed side Pf of the print medium P after printing. Note that the overall operation of the printing apparatus 10 is controlled by a control part 100 (to be described later).

The conveyance part conveys a sheet-shaped print medium P unrolled and fed from a paper roll 27 to the platen 12 using a conveyance roller 23 driven by a conveyance motor (not shown) via gears (see FIG. 2). The printed print medium P is rolled onto a spool 21. The conveyance mechanism of the conveyance part is not limited to this, and any of various publicly-known techniques can be used.

The print part 14 includes a carriage 22 movably provided at a guide shaft 20 and a printhead 24 that is configured to be attachable to and detachable from the carriage 22 and that ejects inks to the print medium P supported by the platen 12. The guide shaft 20 extends in an X direction intersecting with (in the present embodiment, orthogonal to) a Y direction in which the print medium P is conveyed, and the carriage 22 is configured to be able to reciprocate in the +X direction and the −X direction along the guide shaft 20. The printhead 24 includes a plurality of ejection ports 32 (to be described later) that eject an ink and is attached to the carriage 22 so that an ejection port surface 34 (see FIG. 2) where the ejection ports 32 are formed may face the platen 12. In the printing apparatus 10, the printhead 24 is thus configured to be able to eject inks while reciprocating in the ±X directions. For a specific moving mechanism of the carriage 22, any of various publicly-known techniques can be used, such as a mechanism using a carriage belt or a leadscrew that transmits driving power from a carriage motor.

The printing apparatus 10 is provided with a linear encoder (hereinafter also referred to simply as an "encoder") 30 extending in the X direction, and the position of the printhead 24 is controlled by the control part 100 based on a signal from the linear encoder 30. The printhead 24 is configured to be able to eject inks containing color materials and a reaction liquid that reacts with the inks to promote thickening and solidification of the inks. Herein, an ink containing a color material is referred to simply as an ink or as a color ink as appropriate. In the present embodiment, color inks ejected from the printhead 24 are a black ink (a K ink), a cyan ink (a C ink), a magenta ink (an M ink), and a yellow ink (a Y ink). These four color inks are pigment inks containing color materials exhibiting the corresponding colors. Note that the colors and number of inks ejected are not limited to the four colors described above.

In the printing apparatus 10, the print part 14, i.e., the printhead 24 moves at a speed of, for example, 45 inches/sec and performs printing with a resolution of 1200 dpi ($\frac{1}{1200}$ inches). Once the printing starts, the printing apparatus 10 moves the printhead 24 to a print start position and causes the conveyance part to convey a print medium P to a position where the print medium P can be printed by the printhead 24. Next, a printing operation of causing the printhead 24 to eject inks while moving (scanning) in the +X-direction (or the −X direction) is performed based on print data, and once the printing operation is complete, a conveyance operation of causing the conveyance part to convey the print medium P by a predetermined amount is performed. After that, a printing operation of causing the printhead 24 to eject inks while moving in the −X direction (or the +X direction) is performed. In this way, the printing apparatus 10 prints the print medium P by repeating the printing operation and the conveyance operation alternately. Note that the present embodiment executes, for example, multi-pass printing, in which the print part 14 performs printing by making a plurality of scans with respect to a unit area on a print medium.

The heater part 16 applies heat to the printed side Pf of the print medium P printed by ejection of inks (and a reaction liquid) from the print part 14, thereby heating the printed side Pf and the inks applied to the printed side Pf to fixate the inks onto the printed side Pf. The heater part 16 is covered by a cover 17 which has the function of efficiently reflecting the heat from the heater part 16 onto the print medium P and the function of protecting the heater part 16. Various heaters are usable as the heater part 16, such as, for example, a sheathed heater or a halogen heater. Instead of such a contactless heat-transfer heater, the heater part 16 may be configured to apply heat by hot air.

The heater part 16 is not limited to the configuration shown in FIG. 2 in which the print medium P is heated from the printed side Pf. For example, the heater part 16 may be configured to heat the print medium P from a back side Pb of the print medium P by being provided vertically downward (upstream in terms of the +Z direction) of a guide part 19 that is placed downstream of the platen 12 in terms of the +Y-direction and guides the printed print medium P. The heating temperature of the heater part 16 is set considering the ink fixation properties, the productivity of printed products, and the like. Also, a plurality of heater parts 16 may be provided.

Although details will be given later, inks used in the printing apparatus 10 each contain a pigment, resin microparticles, and a water-soluble organic solvent. Thus, the printing apparatus 10 can melt the resin microparticles contained in the ink by heating the resin microparticles with the heater part 16, and further, fixate the pigment onto the print medium by vaporizing the water-soluble organic solvent in the ink.

An ink containing resin microparticles has the property of improving anti-abrasion property (fixation property). Thus, the heating temperature is desirably equal to or more than the minimum film forming temperature of resin microparticles, and also, a majority of the liquid component of the ink, such as water-soluble organic solvent, needs to be vaporized during the heating. Thus, the heater part 16 is configured to form a temperature distribution in the print medium conveyance direction to have a heating time long enough to supply energy necessary to vaporize a majority of the liquid component.

Also, the printing apparatus 10 includes a recovery part (not shown) for maintaining and recovering good performance of the printhead 24 for ejecting the inks and the reaction liquid from the ejection ports 32. This recovery part is provided adjacent to the platen 12, near an end portion of the printhead 24 in the scanning direction (the moving direction). A publicly-known configuration can be used as the recovery part, such as, for example, a wiping part that wipes the ejection port surface 34 or a cap that protects the ejection port surface 34.

The printing apparatus 10 further includes a reflective optical sensor (hereinafter referred to as an "optical sensor" as appropriate) 200 provided upstream of the carriage 22 in terms of the +X-direction to detect the optical property of a printed product (see FIG. 2). In the printing apparatus 10, the control part 100 can detect an optical density (OD) value as a reflective optical property on the print medium P based on a detection result from the optical sensor 200. Note that the installation position of the optical sensor 200 is not limited to the above. Specifically, the optical sensor 200 may be provided downstream of the carriage 22 in terms of the +X direction or downstream of the carriage 22 in terms of the +Y direction. Alternatively, the optical sensor 200 may be provided independently of the carriage 22 and may be configured to be movable in the X-direction or extend in the X direction over the width of the print medium.

<Optical Sensor>

FIG. 3A is a schematic configuration diagram of the optical sensor, and FIG. 3B is a diagram showing a detection spot. The optical sensor 200 is provided to the carriage 22 in a secured manner so that, in the Y direction, its measurement region may be located downstream of ejection port arrays 33 (to be described later) of the printhead 24 in terms of the +Y direction. A lower surface 200a of the optical sensor 200 is located to coincide with the ejection port surface 34 in the Z direction or downstream of the ejection port surface 34 in terms of the +Z direction.

The optical sensor 200 includes alight emitting part 302 implemented by a visible LED such as color red, color green, or color blue and a light receiving part 304 implemented by a photodiode. The light emitting part 302 and the light receiving part 304 are provided at the lower surface 200a of the optical sensor 200. The light emitting part 302 applies light to the print medium P, and the light receiving part 304 receives reflection light reflected by the print medium P. Thus, in the optical sensor 200, light 306 applied by the light emitting part 302 is diffusely reflected by the print medium P, and this reflection light 308 is received by the light receiving part 304. The diameter of a detection spot 310 at which the light 306 applied by the light emitting part 302 is diffusely reflected by the print medium P is, for example, approximately 3 mm.

The light receiving part 304 transmits a detection signal (an analog signal) of the received reflection light 308 to a control circuit on an electric board of the printing apparatus 10 via a flexible cable (not shown) or the like, and the detection signal is then converted into a digital signal by an A/D converter on the control circuit. For the detection of the optical property of a test pattern to be described later, the Y-direction conveyance of the print medium P and the X-direction movement of the carriage 22 to which the optical sensor 200 is attached are performed alternately. In synchronization with the timing based on a position signal obtained by the encoder 30, the optical sensor 200 detects, as an optical reflectance, the density of a printed result printed on the print medium P (hereinafter also referred to as a "printed product"). In this way, the printing apparatus 10 applies light to each pattern of a test pattern on the print medium P and detects a reflection intensity which represents the density of the pattern. The reflection intensity is high on a white print medium P and lower on a pattern with a higher density.

<Configuration of the Printhead>

Figure 4:
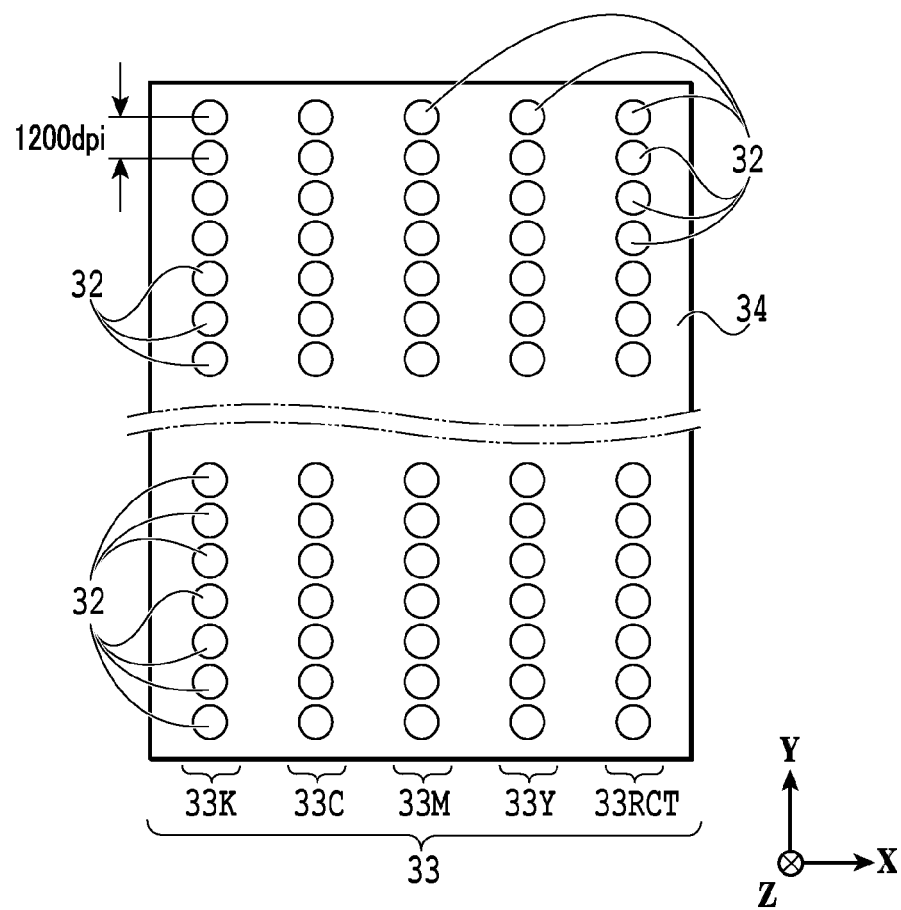
FIG. 4 is a diagram showing an ink ejection port surface of a printhead.

Next, the configuration of the printhead 24 is described. FIG. 4 is a diagram showing the ejection port surface of the printhead 24. Note that FIG. 4 is a diagram showing the ejection port surface 34 in the +Z direction. The ejection port surface 34 of the printhead 24 has formed thereon the ejection port arrays 33 each formed by a plurality of ejection ports 32 that are arranged in the Y direction and eject a corresponding liquid. Specifically, formed on the ejection port surface 34 are, sequentially in the +X direction, an ejection port array 33K that ejects a K ink, an ejection port array 33C that ejects a C ink, an ejection port array 33M that ejects an M ink, an ejection port array 33Y that ejects a Y ink, and an ejection port array 33RCT that ejects a reaction liquid RCT.

As described earlier, the reaction liquid RCT reacts with the color inks to promote solidification and thickening of the color inks. Specifically, the reaction liquid RCT contains no color material but contains a reactive component that reacts with color materials contained in the color inks, and solidifies and thickens the color inks by coming into contact with the color inks. The reaction liquid RCT thus helps prevent smearing of the color inks on the print medium P.

In the present embodiment, each ejection port array 33 has 1,280 ejection ports 32 arranged in the Y direction at an interval of 1200 dpi. The amount of liquid (a color ink or a reaction ink) ejected at once from a single ejection port 32 is, for example, approximately 4.5 pl. Also, each ejection port array 33 is connected to a tank (not shown) that stores a corresponding liquid, and an ink or a reaction liquid is supplied from the tank. The tanks may be configured integrally with the printhead 24 or may be configured to be attachable to and detachable from the carriage 22.

<Color Inks and Reaction Liquid>

Next, a description is given of the color inks and the reaction liquid used in the printing apparatus 10.

=Color Inks=

In the present embodiment, the printing apparatus 10 can use a pigment ink containing a pigment or a water-soluble resin microparticle ink containing no or very little pigment. The pigment ink and the water-soluble resin microparticle ink each contain a water-soluble organic solvent. In order for a color ink to exhibit a desired property according to necessity, various types of surfactant, antifoam, antiseptic, antifungal agent, and the like may be added as needed.

A color ink contains water-soluble resin microparticles that bring a color material into a close contact with the print medium P to improve the anti-abrasion property (fixation property) of the printed image. The resin microparticles melt by heat, and a heater (such as the heater part 16) forms a film of the resin microparticles and dries the solvent contained in the ink. In the present embodiment, the resin microparticles are polymer microparticles that exist in water in a dispersed manner. Also, the polymer microparticles that exist in water in a dispersed manner may be the form of resin microparticles obtained by homopolymerization of a monomer having a dissociable group or by copolymerization of a plurality of kinds, i.e., what is called a self-dispersion-type resin microparticle dispersion.

The color inks each contain a surfactant. As the surfactant, a penetrant for improving the permeability of the color ink into a print medium P for inkjet printers is used. In the present embodiment, adjustments are made so that the surface tension of each color ink may be 30 dyn/cm or less with differences between the surface tensions of the color inks being 2 dyn/cm or below. Specifically, the surface tension of each color ink is approximately 28 dyn/cm to 30 dyn/cm.

Also, each color ink preferably has a pH of between 7.0 and 10, both inclusive, from the perspective of preventing elution of impurities from an ink-contacting member in the printing apparatus 10 or the printhead 24, deterioration of a material forming the member, or decrease in the solubility of a pigment dispersion resin in the ink. The color inks used in the present embodiment use anionic color materials. Thus, the pH of each color ink is alkali stable, and its value is 8.5 to 9.5.

=Reaction Liquid=

The reaction liquid contains, e.g., a reactive component that reacts with the pigment contained in each color ink to agglutinate or gelatinize the pigment or a reactive component that reacts with a resin and the like to make them insoluble. The reactive component is, for example, a component that, by being mixed with an ink having a target component stably dispersed in an aqueous medium due to the action of an ionic group, can destroy the dispersion stability in the ink. For example, an organic acid such as glutaric acid can be used as the reactive component. The content of the organic acid in the reactive liquid is preferably between 3.0% by weight and 90.0% by weight, both inclusive, and is more preferably between 5.0% by weight and 70.0% by weight, both inclusive, in reference to the total mass of the compositions included in the reaction liquid. Like the color inks, a surfactant is added to the reaction liquid as well.

<Control Configuration of the Printing Apparatus>

Figure 5:
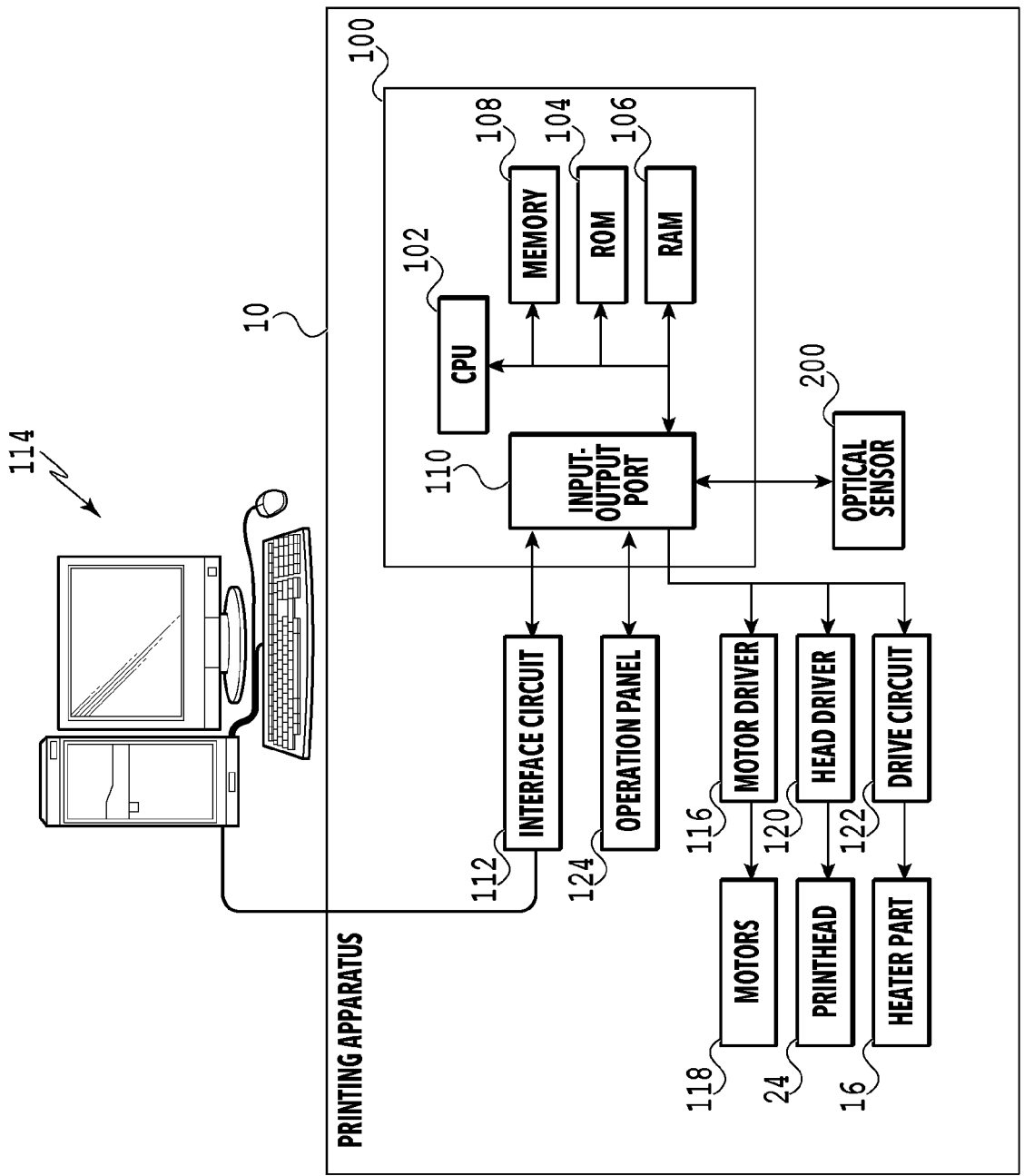
FIG. 5 is a block configuration diagram of a control system of the printing apparatus.

Next, the configuration of the control system of the printing apparatus 10 is described. FIG. 5 is a block configuration diagram of the control system of the printing apparatus 10.

The control part 100 that performs the overall control of the printing apparatus 10 includes a central processing unit (CPU) 102, a ROM 104, a RAM 106, and a memory 108. Based on various programs, the CPU 102 performs, e.g., control of the operation of each member forming the printing apparatus 10 and processing on inputted image data. The ROM 104 functions as a memory to store, e.g., programs for various types of control executed by the CPU 102 and for processing of image data. The RAM 106 stores various kinds of data used for the control of the printing apparatus 10. The memory 108 stores various kinds of data such as mask patterns and test patterns to be described later. The control part 100 also includes an input-output port 110 and is connected to various drivers, driving circuits, and the like via this input-output port 110.

The control part 100 is connected to an interface circuit 112 via the input-output port 110 and is connected to a host apparatus 114 via the interface circuit 112. The control part 100 is also connected to a user-operable operation panel 124 via the input-output port 110. A user inputs image data to the printing apparatus 10 via the host apparatus 114, and also inputs various kinds of information to the printing apparatus 10 via the host apparatus 114 and the operation panel 124. The control part 100 is also connected to a motor driver 116 via the input-output port 110 and controls the driving of motors 118 via the motor driver 116. Note that in FIG. 5, various motors in the printing apparatus 10, such as a motor for moving the carriage 22 and a motor for driving the conveyance part that conveys the print medium P, are shown collectively as the motors 118.

The control part 100 is also connected to a head driver 120 via the input-output port 110 and controls the printhead 24 via the head driver 120 to eject the inks. The control part 100 is connected to a drive circuit 122 via the input-output port 110 and controls the driving of the heater part 16 via the drive circuit 122. The control part 100 is also connected to the optical sensor 200 via the input-output port 110 to control the driving of the optical sensor 200 and to detect the optical property of the test pattern based on an output from the optical sensor 200. In this way, in the present embodiment, the control part 100 and the optical sensor 200 function as a detection part capable of detecting the optical property of a printed product, which is a print result printed on the print medium.

In the control part 100, the CPU 102 converts image data inputted from the host apparatus 114 into print data and stores the print data in the RAM 106. Specifically, upon obtaining image data expressed by 8-bit, 256-level information (0 to 255) on each of RGB, the CPU 102 converts this image data into multivalued data expressed in a plurality of types of ink used for printing (in the present embodiment, K, C, M, Y). By this color conversion processing, multivalued data expressed by 8-bit, 256-level information (0 to 255) defining the level of each of the inks K, C, M, and Y for a pixel group formed by a plurality of pixels is generated.

Next, quantization is performed for the multivalued data expressed in K, C, M, and Y to generate quantized data (binary data) expressed by 1-bit binary information (0, 1) defining ejection or non-ejection of each of the inks K, C, M, and Y with respect to each pixel. Any of various publicly-known quantization methods can be used for this quantization processing, such as error diffusion, dithering, and indexing. After that, division processing is performed to divide the quantized data into a plurality of scans by the printhead 24 with respect to a unit area. Print data is generated by this division processing, the print data being expressed by 1-bit binary information (0, 1) defining ejection or non-ejection of each of the inks K, C, M, and Y for each pixel in each of the plurality of scans with respect to a unit area on the print medium P. This division processing is executed using mask patterns corresponding to a plurality of scans and defining permission and non-permission of ink ejection with respect to each pixel. Note that the generation of print data is not limited to being executed by the control part 100. The generation of print data may be executed by the host apparatus 114, or part of the processing may be executed by the host apparatus 114, and the rest of the processing may be executed by the control part 100.

<Obtaining Processing>

In the above configuration, the printing apparatus 10 performs printing processing of performing printing on the print medium P based on print data. In this printing processing, the printhead 24 performs printing with respect to a unit area on a print medium by ejecting the inks (and the reaction liquid) while moving in the X direction via the carriage 22. In this printing, basically, the color inks and the reaction liquid are ejected within the same area by respective predetermined amounts. Thereby, by coming into contact with color inks in a certain ratio, the reaction liquid can produce the effect of reducing ink smears caused especially notably on a non-absorbing print medium. Also, the printing apparatus 10 conveys the print medium P having the color inks and the reaction liquid ejected thereon and passes the print medium P by the heater part 16 to heat and dry the color inks, thereby performing printing while promoting ink fixation even on a non-absorbent or poorly-absorbent print medium.

As described above, in the printing apparatus 10, the color inks and the reaction ink need to be ejected to the same area. Thus, the printing apparatus 10 is configured to be able to obtain a displacement amount of the relative ejection positions of the reaction liquid from the ejection positions of the color inks. In the following description, a "displacement amount of the relative ejection positions of the reaction liquid from the ejection positions of the color inks" is also referred to as a "displacement amount of the ejection positions of the reaction liquid." The obtaining processing of obtaining a displacement amount of the relative ejection positions of the reaction liquid from the ejection positions of the color inks is executed in response to, for example, an instruction to start the obtaining processing, the instruction being issued by a user via the host apparatus 114, the operation panel 124, or the like. Based on the displacement amount of the ejection positions of the reaction liquid obtained by the obtaining processing, the printing apparatus 10 obtains a correction value for correcting the ejection timing for the reaction liquid. Then, in the printing processing, the reaction liquid is ejected with the ejection timing of the reaction liquid corrected based on the correction value obtained.

The following describes details of the obtaining processing of obtaining a displacement amount of the relative ejection positions of the reaction liquid from the ejection positions of the color inks, which is executed by the printing apparatus 10, and test patterns printed in the obtaining processing.

=Test Patterns=

Figure 6B:
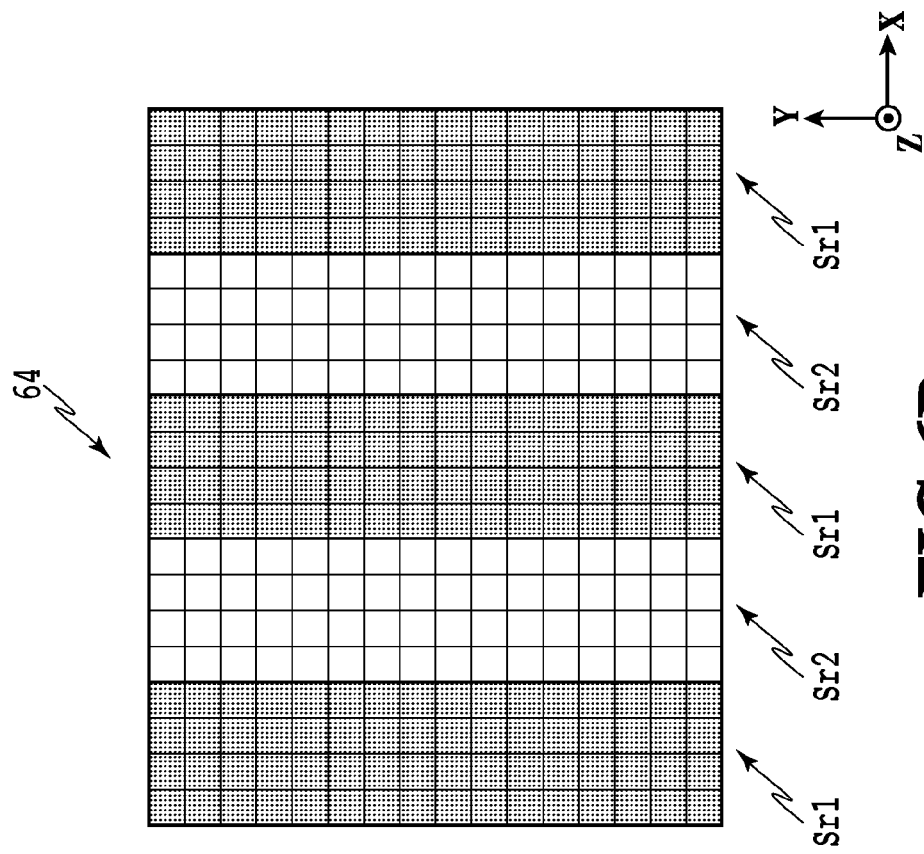
FIGS. 6A and 6B are a diagram showing a pattern by color inks and a pattern by a reaction liquid, respectively, in a test pattern.
Figure 6A:
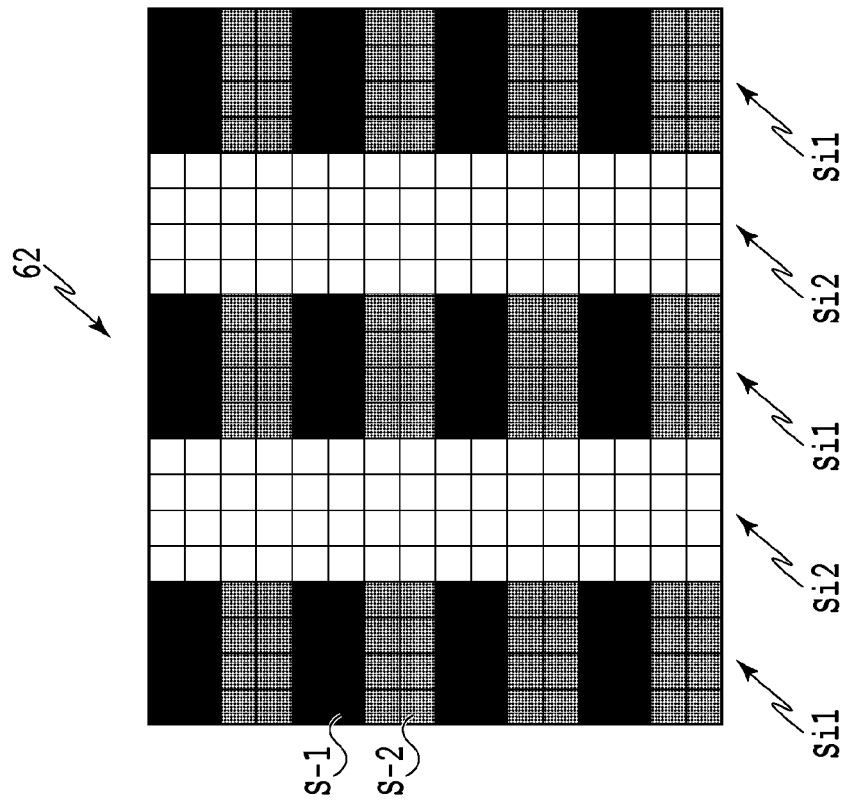
Figure 7:
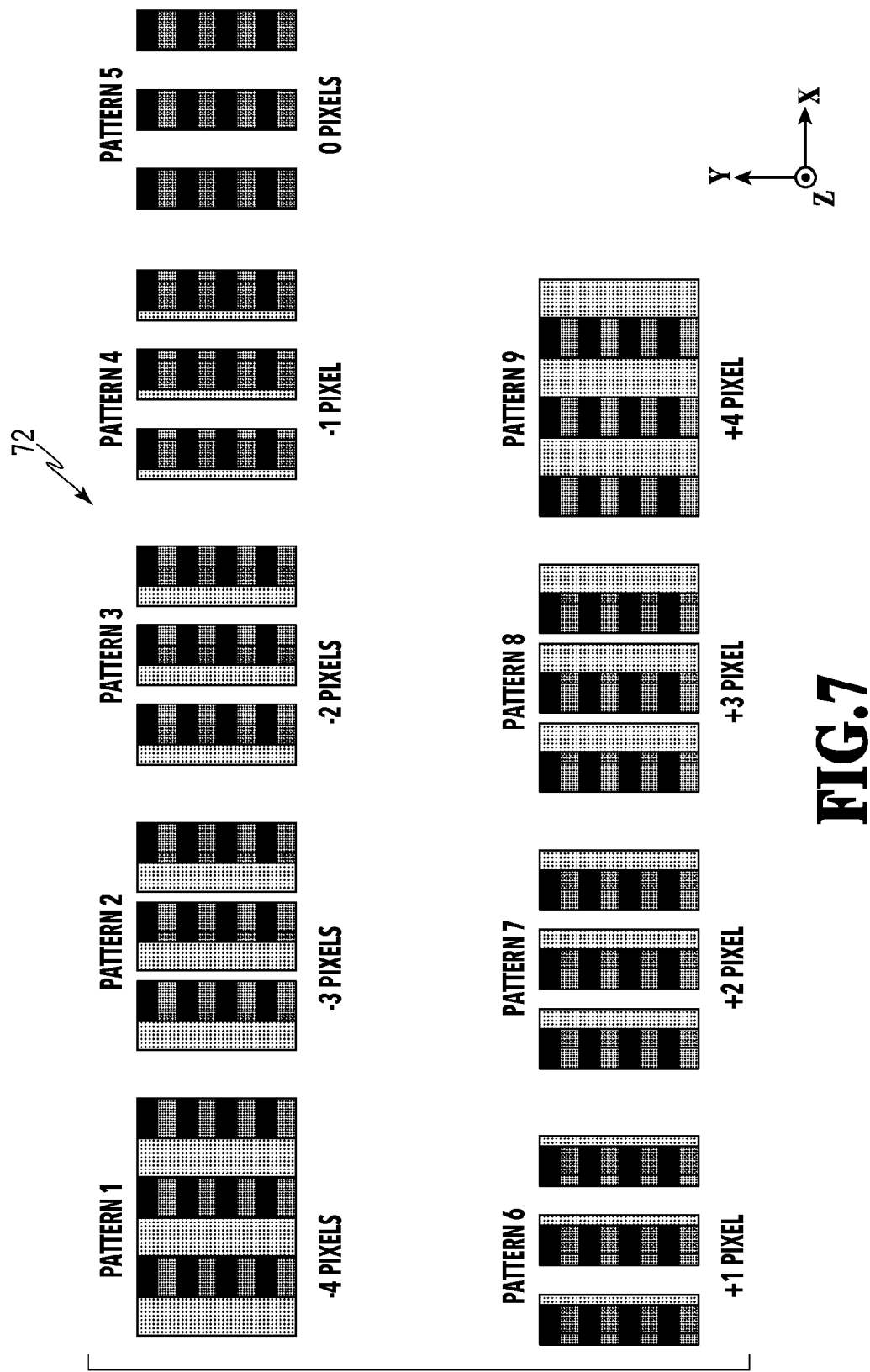
FIG. 7 is a diagram showing a test pattern using the patterns in FIGS. 6A and 6B.

First, test patterns used in the obtaining processing are described. FIG. 6A is a diagram showing a pattern formed by color inks in a test pattern, and FIG. 6B is a diagram showing a pattern formed by the reaction liquid in a test pattern. FIG. 7 is a diagram showing an example test pattern using the patterns in FIGS. 6A and 6B. Note that in FIG. 7, a displacement amount of the ejection positions of the reaction liquid from the ejection positions of the color inks, i.e., a displacement amount between the pattern by the color inks and the pattern by the reflection ink, is shown under each pattern forming the test pattern.

A test pattern 72 (see FIG. 7) includes a plurality of patterns each formed by a first pattern 62 by two color inks (see FIG. 6A) and a second pattern 64 by the reaction liquid (see FIG. 6B). Specifically, the test pattern 72 includes a plurality of juxtaposed patterns in which the second pattern 64 is displaced from the first pattern 62 in the X direction by a predetermined amount at a time.

More specifically, the first pattern 62 is formed using two color inks different from each other. For example, a K ink and a Y ink are used as the two color inks forming the first pattern 62. By using these two color inks, a smear portion between the two color inks produces a color close to K (black), making the optical property (optical density) largely different from a case where there is no smear. In other words, the combination of two color inks used for the first pattern 62 is determined so that an optical property more approximate to one of the inks is exhibited with a greater degree of smearing.

As shown in FIG. 6A, in the first pattern 62, ejection regions Si1 where two color inks are ejected and non-ejection regions Si2 where the two color inks are not ejected are arranged alternately in the X direction. The ejection regions Si1 and the non-ejection regions Si2 have the same length as each other in the X direction and in the Y direction. In the present embodiment, the ejection regions Si1 and the non-ejection regions Si2 each have four pixels in the X direction and 16 pixels in the Y direction. In each ejection region Si1, regions S-1 where one of the two color inks, a color ink 1, is ejected and regions S-2 where the other one, a color ink 2, is ejected are arranged alternately in the Y direction. In the present embodiment, the regions S-1 and the regions S-2 each have four pixels in the X direction and two pixels in the Y direction. Thus, four regions S-1 and four regions S-2 are formed in each ejection region Si1.

As shown in FIG. 6B, in the second pattern 64, ejection regions Sr1 where the reaction liquid RCT is ejected and non-ejection regions Sr2 where the reaction liquid RCT is not ejected are arranged alternately in the X direction. The ejection regions Sr1 and the non-ejection regions Sr2 have the same length as each other and as the ejection regions Si1 and the non-ejection regions Si2 of the first pattern 62 in the X direction and in the Y direction. Hence, in the present embodiment, the ejection regions Sr1 and the non-ejection regions Sr2 each have four pixels in the X direction and 16 pixels in the Y direction.

In the present embodiment, each test pattern 72 includes nine patterns 1 to 9 as shown in FIG. 7. In each pattern, a displacement amount of the second pattern 64 from the first pattern 62 in the X direction is different from that in its adjacent pattern by one pixel. Specifically, the pattern 1 is a pattern in which the second pattern 64 is displaced from the first pattern 62 in the −X direction by four pixels (−4 pixels). The pattern 2 is a pattern in which the second pattern 64 is displaced from the first pattern 62 in the −X direction by three pixels (−3 pixels). The pattern 3 is a pattern in which the second pattern 64 is displaced from the first pattern 62 in the −X direction by two pixels (−2 pixels). The pattern 4 is a pattern in which the second pattern 64 is displaced from the first pattern 62 in the −X direction by one pixel (−1 pixel). The pattern 5 is a pattern in which the second pattern 64 is displaced from the first pattern 62 by 0 pixels, i.e., coincides with the first pattern 62. The pattern 6 is a pattern in which the second pattern 64 is displaced from the first pattern 62 in the +X direction by one pixel (+1 pixel). The pattern 7 is a pattern in which the second pattern 64 is displaced from the first pattern 62 in the +X direction by two pixels (+2 pixels). The pattern 8 is a pattern in which the second pattern 64 is displaced from the first pattern 62 in the +X direction by three pixels (+3 pixels). The pattern 9 is a pattern in which the second pattern 64 is displaced from the first pattern 62 in the +X direction by four pixels (+4 pixels).

In the pattern 1 in which the second pattern 64 is displaced from the first pattern 62 in the X direction by −4 pixels and the pattern 9 in which the second pattern 64 is displaced from the first pattern 62 in the X direction by +4 pixels, there is no overlap between the ejection regions Si1 of the first pattern 62 and the ejection regions Sr1 of the second pattern 64. By contrast, in the pattern 5, the ejection regions Sr1 of the second pattern 64 overlap entirely with the ejection regions Si1 of the first pattern 62. Although in the test pattern 72, the displacement amount between the first pattern 62 and the second pattern 64 of each pattern differs from that of its adjacent pattern by one pixel, this displacement amount is not limited to one pixel.

In a case where the ejection positions of the reaction liquid are not displaced from the ejection positions of the color inks, in the pattern 5 of this test pattern 72, the first pattern 62 and the second pattern 64 coincide with each other, i.e., the ejection regions Sr1 overlap entirely with the ejection regions Si1. Meanwhile, in a case where the ejection positions of the reaction liquid are displaced from the ejection positions of the color inks by +3 pixels, in each pattern, the second pattern 64 is displaced from the first pattern 62 in the +X direction by three pixels. Thus, in this case, the first pattern 62 and the second pattern 64 coincide with each other in the pattern 2. This therefore means that the ejection positions of the reaction liquid from the ejection positions of the color inks need to be displaced relatively by "−3 pixels," which is the displacement amount of the pattern 2. In this way, a relative displacement amount of the ejection positions of the reaction liquid from the ejection positions of the color inks can be obtained from the print results of the test pattern 72.

Figure 8B:
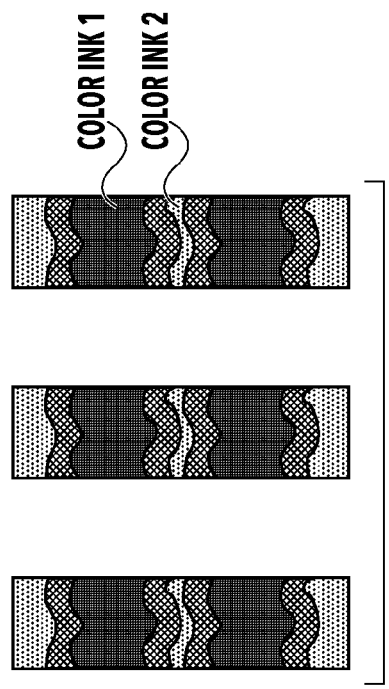
FIGS. 8A and 8B are diagrams illustrating how two color inks smear into each other.
Figure 8A:
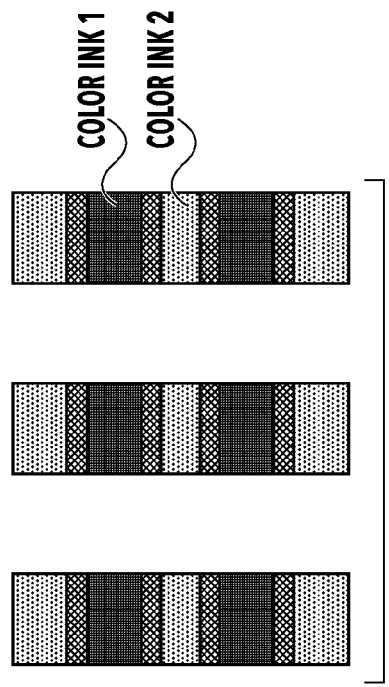

In a case where the second pattern 64 is displaced from the first pattern 62, smearing tends to occur at a portion where the regions S-1, S-2 where the two color inks are ejected are adjacent to each other. FIGS. 8A and 8B are diagrams illustrating smearing of two color inks ejected for the first pattern of a test pattern. For example, in a case where the first pattern 62 and the second pattern 64 coincide with each other, i.e., the ejection regions Sr1 coincide and overlap entirely with the ejection regions Si1, the color inks 1 and 2 smear into each other to a small degree, as shown in FIG. 8A. By contrast, in a case where there is no overlap between the first pattern 62 and the second pattern 64, i.e., there is no overlap between the ejection regions Si1 and the ejection regions Sr1, the color inks 1 and 2 smear into each other to a large degree, as shown in FIG. 8B.

The optical property is different between a small degree of bleeding and a large degree of bleeding. For example, in a case where a K ink and a Y ink are used as the two color inks, the K ink and the Y ink are mixed with each other at the smear portion, and the optical property at the smear portion is influenced greatly by the optical property of the K ink and becomes closer to that of the K ink. Thus, in a case where there is a large degree of smearing between the color inks 1 and 2, the optical property of the K ink is strongly exhibited.

Figure 9:
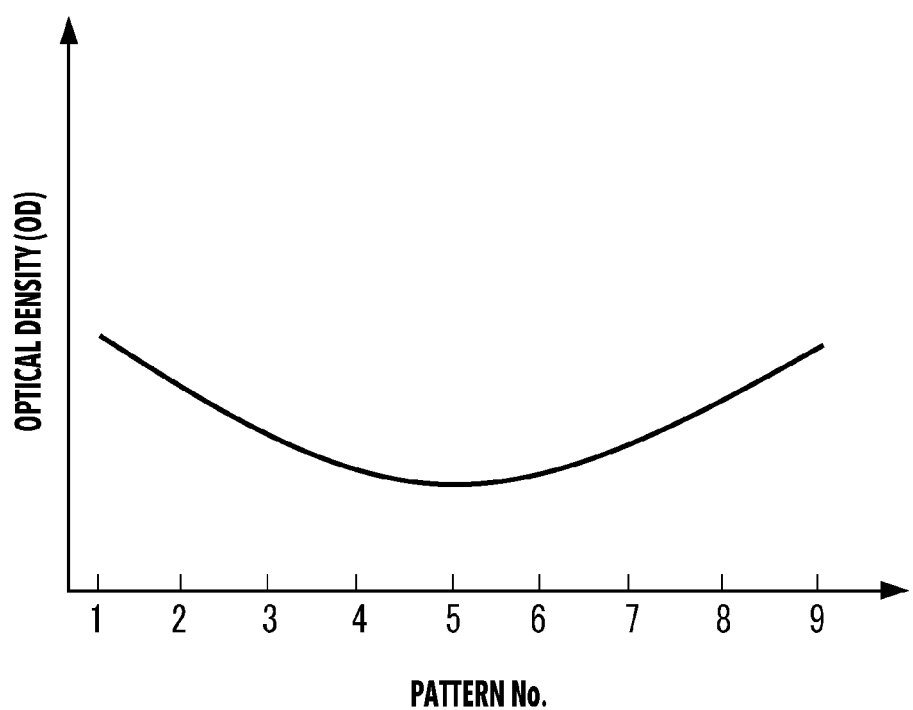
FIG. 9 is a diagram showing the optical property of a test pattern.

In a case where there is no displacement between the ejection positions of the reaction liquid from the ejection positions of the color inks, the optical property of the test pattern 72 using the first pattern 62 and the second pattern 64 is as shown in FIG. 9. FIG. 9 is a diagram showing the optical property of a test pattern in a case where there is no displacement of the relative ejection positions of the reaction liquid from the ejection positions of the color inks. In FIG. 9, the horizontal axis represents the patterns of the test pattern 72, and the vertical axis represents the optical density (OD value). The optical property of the test pattern 72 is expressed based on the optical density of each pattern.

In a case where there is no displacement of the ejection positions of the reaction liquid from the ejection positions of the color inks, the ejection regions Sr1 of the reaction liquid overlap entirely with the ejection regions Si1 of the color inks in the pattern 5 with a displacement amount of "0 pixels." Then, there is only a small degree of smearing, so that in a case where the two color inks used for the test pattern 72 are a K ink and a Y ink, the optical property of the K ink is exhibited relatively weakly, indicating a low optical density value. Meanwhile, the larger the displacement amount is, the less the ejection regions Si1 and the ejection regions Sr1 overlap, leading to a greater degree of smearing. Thus, with a larger displacement amount, the optical property of the K ink is exhibited more strongly, indicating a higher optical density value.

Thus, in a case where there is a displacement between the ejection positions of the color inks and the ejection positions of the reaction liquid, the optical density is the smallest in a pattern that has no displacement because the displacement amount of the ejection positions of the reaction liquid and the displacement amount on the test pattern 72 cancel each other out. Using such a phenomenon, the printing apparatus 10 can obtain the displacement amount of the ejection positions of the reaction liquid from the ejection positions of the color inks by identifying the pattern with the lowest optical density. For example, in a case where the optical density is the lowest in the pattern 2 of the test pattern 72, it means that "−3 pixels," which is the displacement amount in the pattern 2, are canceled out. Thus, "+3 pixels" can be obtained as the displacement amount of the ejection positions of the reaction liquid from the ejection positions of the color inks.

The degree of smearing of color inks ejected onto a print medium differs greatly depending on the property of the print medium, i.e., its absorbency for liquid such as ink. For example, a print medium with a high absorbency causes smearing less likely, whereas a print medium with a low absorbency causes smearing more likely. Also, a non-absorbent or poorly-absorbent print medium causes smearing notably. Because the way the inks smear thus varies depending on the absorbency of a print medium to be printed, an accurate displacement amount of the relative ejection positions of the reaction liquid from the ejection positions of the color inks may not be obtainable in a case of using bleeding between the two inks to obtain the displacement amount.

Specifically, in a case of using a print medium with a low absorbency, such as one with no absorbency or poor absorbency, smearing occur even in a case where the ejection regions Si1 of the color inks and the ejection regions Sr1 of the reaction liquid coincide and overlap with each other. Then, differences in optical density among patterns produced depending on how much the ejection regions Sr1 overlap with the ejection regions Si1 may become so small that the displacement amount cannot be obtained. Also, in a case of using a print medium with a high liquid absorbency, smearing is less likely to occur between the color inks 1 and 2, producing no difference in optical density among the patterns, so that the displacement amount cannot be obtained.

Figure 10A:
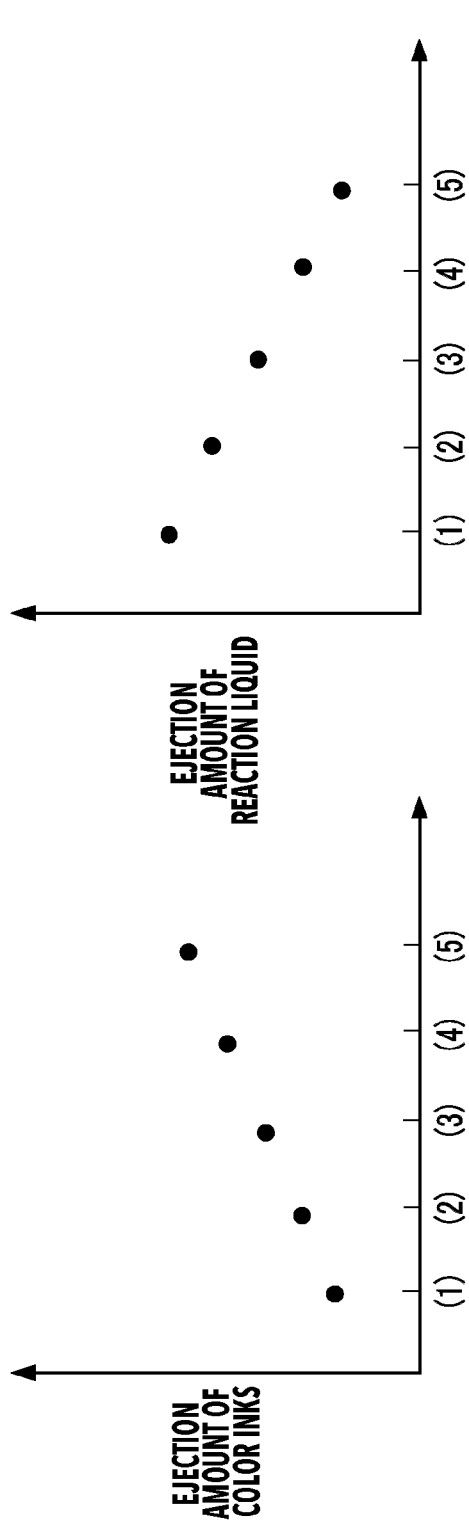
FIGS. 10A to 10C are diagrams showing the differences in print conditions among a plurality of test patterns.
Figure 10B:
Figure 10C:
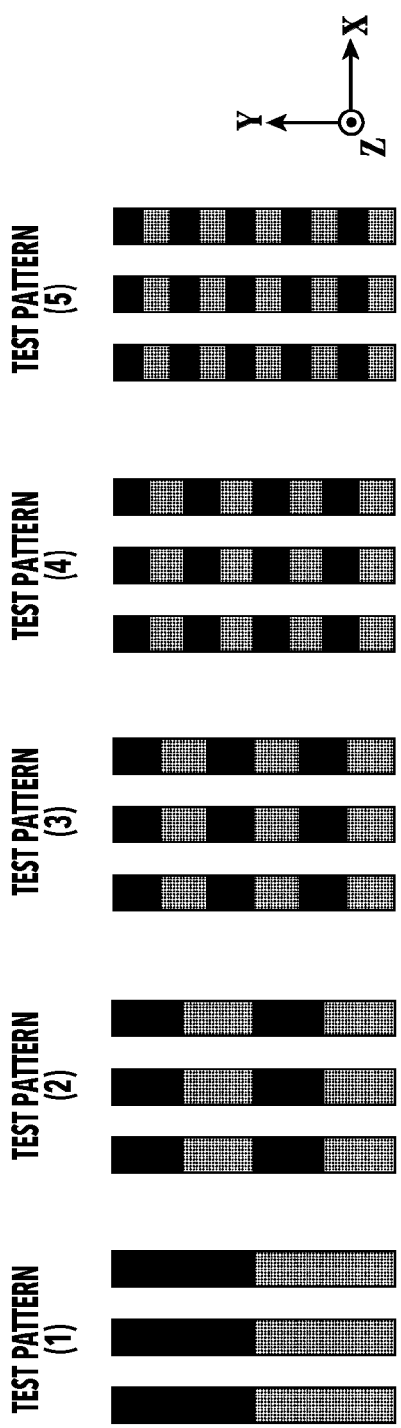

Thus, in the present embodiment, a plurality of test patterns 72 with different print conditions are used in the obtaining processing. Specifically, a plurality of test patterns varying in at least one of the following print conditions are used: the ejection amount of the color inks 1, 2, the ejection amount of the reaction liquid, and the Y-direction length of the regions where the color inks 1, 2 are ejected. FIGS. 10A to 10C are diagrams illustrating differences in the print conditions. FIG. 10A is a diagram showing how the ejection amount of the color inks 1, 2 is changed among test patterns. FIG. 10B is a diagram showing how the ejection amount of the reaction liquid is changed among the test patterns. FIG. 10C shows how the first pattern is different among the test patterns.

More specifically, to vary the ejection amount of the color inks as a print condition, the amount of the color inks 1, 2 ejected to form the first pattern 62 is varied in, for example, five stages as shown in FIG. 10A. To be more specific, among five test patterns, the ejection amount of the color inks 1, 2 is increased by a predetermined amount at a time in stages from the test pattern (1) to the test pattern (5). Also, to vary the ejection amount of the reaction liquid, the amount of the reaction liquid ejected to form the second pattern 64 is varied in, for example, five stages as shown in FIG. 10B. To be more specific, among the five test patterns, the ejection amount of the reaction liquid is decreased by a predetermined amount at a time in stages from the test pattern (1) to the test pattern (5). Further, to vary the Y-direction length of the regions where the color inks 1, 2 are ejected in the first pattern 62, the Y-direction length is varied in, for example, five stages as shown in FIG. 10C. To be more specific, among the five test patterns, the Y-direction length of each of the regions S-1, S-2 where the color inks 1, 2 are ejected in the first pattern 62 is reduced sequentially from the test pattern (1) to the test pattern (5).

Note that any one of or a combination of the ejection amount of the color inks, the ejection amount of the reaction liquid, and the Y-direction length of the regions where the color inks 1, 2 are ejected may be changed among the plurality of test patterns 72 used in the obtaining processing. The ejection amount of the color inks is varied within the range between, for example, 10 ng/600 dpi and 50 ng/600 dpi, both inclusive. The ejection amount of the reaction liquid is varied within the range between, for example, 0 ng/600 dpi and 50 ng/600 dpi, both inclusive.

Also, in a case where the diameter of the range detected by the optical sensor 200, i.e., the detection spot 310, is, for example, between 0.1 mm and 5 mm, both inclusive, the Y-direction length of the regions S-1, S-2 where the color inks 1, 2 are ejected is varied within the range between 0.01 mm and 2.5 mm, both inclusive. Then, the length of contact portions between the color ink 1, 2 included in the detection spot 310 at the time of optical property detection is varied between 0.02 mm and 600 mm, both inclusive, and the number of the contact portions is varied between 1 and 30,000, both inclusive. Note that a contact portion between the color inks 1, 2 is a border portion between the region S-1 where the color ink 1 is ejected and the region S-2 where the color ink 2 is ejected, and the border portion extends in the X-direction in FIG. 6A. Also, the length of the contact portions between the color inks 1, 2 included in the detection spot 310 is the total sum of the lengths of the contact portions located inside the detection spot 310. Also, the number of contact portions between the color inks 1, 2 included in the detection spot 310 is the total number of the contact portions located in the detection spot 310.

Varying the ejection amounts of the color inks and the reaction liquid yields differences in the degree to which the color inks smear, thereby allowing creation of a plurality of test patterns 72 with different degrees of smearing. Also, varying the Y-direction length of the regions where the color inks 1, 2 are ejected (hereinafter referred to simply as a "Y-direction length" as appropriate) changes the length of the contact portions between the color inks 1, 2 (hereinafter referred to simply as a "contact portion length" as appropriate), thereby allowing creation of a plurality of test patterns 72 with different degrees of smearing. The Y-direction length and the contact portion length affect the optical density of each pattern. A long contact portion length means heavy influence by smearing, but it also means a short Y-direction length. Thus, in a case where a print medium susceptible to smearing is used with the contact length being long, even if the ejection regions Sr1 overlap with the ejection regions Si1, a smear produced at one contact portion reaches a smear produced at an adjacent contact portion, making the entire regions S-1, S-2 smear. As a result, the differences in smearing among the patterns of the test pattern 72 do not appear sufficiently, producing no differences in optical density among the patterns.

=Obtaining Processing=

Figure 11:
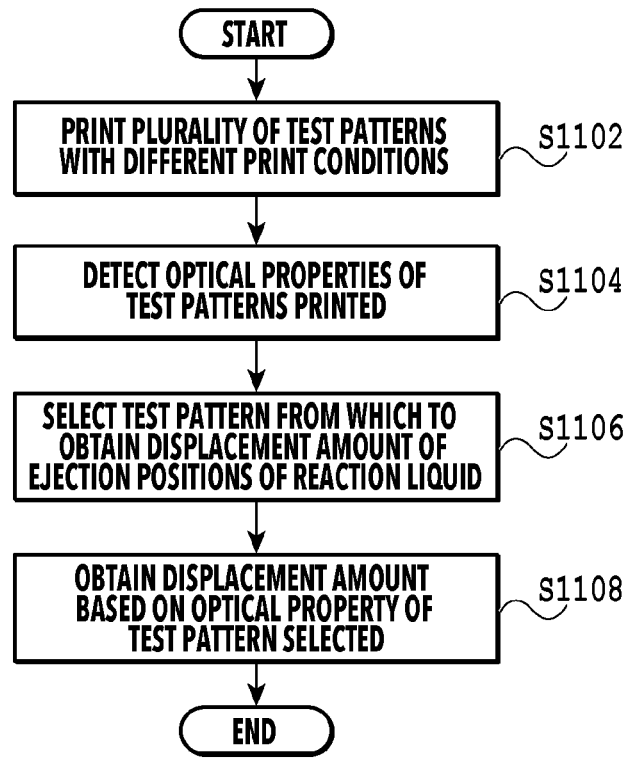
FIG. 11 is a flowchart showing a detailed processing routine for obtaining processing.
Figure 12A:
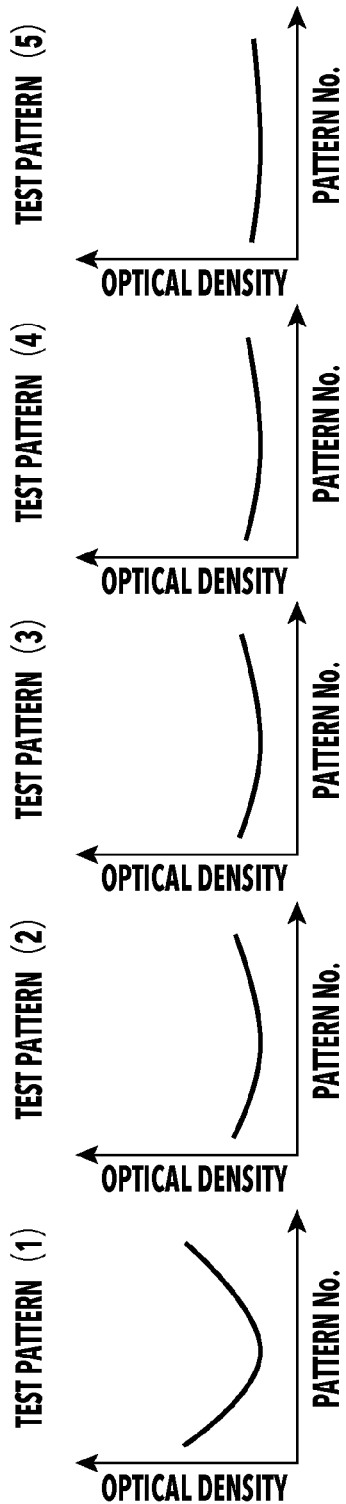
FIGS. 12A and 12B are diagrams showing the optical properties of a plurality of test patterns for print media with different absorbencies.
Figure 12B:
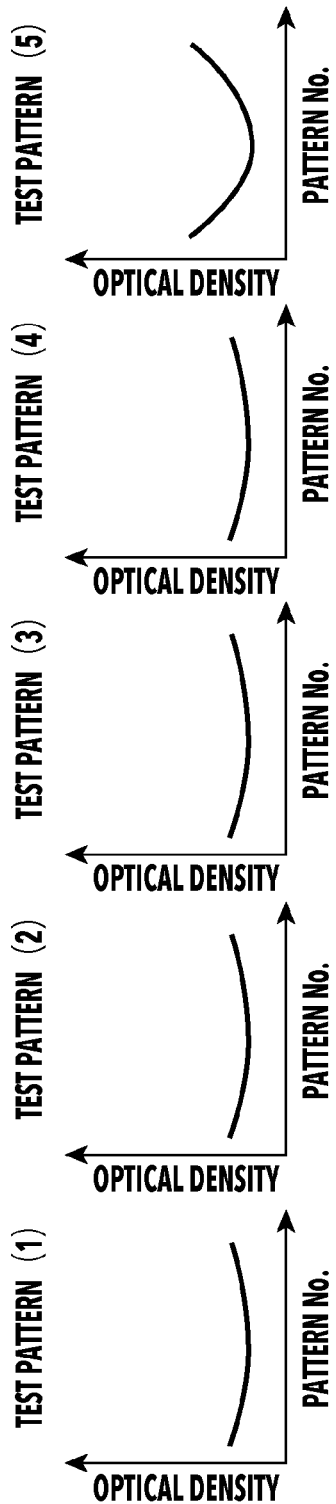

Upon being instructed to start the obtaining processing via the host apparatus 114, the operation panel 124, or the like, the printing apparatus 10 starts the obtaining processing for obtaining a displacement amount of the relative ejection positions of the reaction liquid from the ejection positions of the color inks. FIG. 11 is a flowchart showing a detailed processing routine for the obtaining processing. FIGS. 12A and 12B are diagrams showing the optical property of each test pattern obtained by printing five test patterns with different print conditions. FIG. 12A shows a case where a glossy vinyl chloride film is used as a print medium, and FIG. 12B shows a case where coated paper is used as a print medium.

A series of processing shown in the flowchart in FIG. 11 is performed by the CPU 102 loading program code stored in the ROM 104 into the RAM 106 and executing the program code. Alternatively, some or all of the functions in the steps in FIG. 11 may be executed by hardware such as an ASIC or an electric circuit. Note that the letter S used in the description of the processing means that it is a step in the flowchart.

Once the obtaining processing is started, first, the CPU 102 prints a plurality of test patterns 72 with different print conditions (S1102). The plurality of test patterns 72 with different print conditions are stored in the memory 108, and these test patterns 72 are used and printed in S1102. For example, five test patterns 72 with different print conditions are printed in S1102. After the plurality of test patterns 72 are printed, next, the CPU 102 detects the optical property of each of the printed test patterns 72 using the optical sensor 200 (S1104). In S1104, the optical density of each pattern of each test pattern 72 is detected based on the amount of light received by the optical sensor 200. In this way, in the present embodiment, the control part 100 including the CPU 102 functions as a control part that controls the printhead 24 to print the test patterns and controls the optical sensor 200 that detects the optical property of each printed test pattern.

After that, based on the detected optical properties of the test patterns 72, the CPU 102 selects a test pattern 72 from which to obtain a displacement amount of the relative ejection positions of the reaction liquid from the ejection positions of the color inks (S1106). In the present embodiment, the optical densities of patterns of each test pattern 72 are measured, the patterns including different degrees of smearing between the color inks 1, 2 depending on how much the ejection regions Sr1 of the reaction liquid overlap with the ejection regions Si1 of the color inks. However, the degree of smearing of the color inks 1, 2 differs depending on the property, i.e., the absorbency, of the print medium. Thus, in S1106, a test pattern 72 is selected which exhibits an optical property such that its patterns have certain differences or more in optical density and that the lowest optical density value can be obtained. In other words, a test pattern 72 is selected which exhibits an optical property such that the difference in optical density between adjacent ones of its patterns is larger than a predetermined value and that a pattern with an optical density of the lowest level can be identified as a significant difference.

Specifically, an example is assumed here where the test patterns (1) to (5) shown in FIG. 10C with different Y-direction lengths of the regions where the color inks 1, 2 are ejected in the first pattern 62 are printed on a print medium in S1102. In a case where a glossy vinyl chloride film (Inkjet Media IJ1220N manufactured by 3M Japan Limited) is used as a print medium, the optical properties of the respective test patterns are as shown in FIG. 12A. In a case where coated paper (OK TopKote+ manufactured by Oji Paper Co., Ltd.) is used as a print medium, the optical properties of the respective test patterns are as shown in FIG. 12B.

In a case where a glossy vinyl chloride film, which has a low absorbency, is used, much of the ejected inks exists on the print medium, unabsorbed by the print medium. For this reason, the color inks 1, 2 of the first pattern 62 smear to a large degree. Thus, even in a case where the ejection regions Sr1 of the reaction liquid overlap entirely with the ejection regions Si1 of the color inks of the first pattern 62, there is a large degree of smearing. Thus, in a case where the Y-direction length of the regions S-1, S-2 where the color inks 1, 2 are ejected is small, no difference in optical density is produced between patterns due to the smearing dependent on the overlap of the reaction liquid. More specifically, in a case of using a print medium with a low absorbency such as a glossy vinyl chloride film, a test pattern with a longer Y-direction length of the ejection regions S-1, S2 of the color inks 1, 2 can exhibit an optical property such that the lowest value can be obtained more properly. In FIG. 12A, the test pattern (1) with the longest Y-direction length of the regions S-1, S-2 where the color inks 1, 2 are ejected exhibits an optical property indicating that there are sufficient differences in optical density among the patterns. Thus, in a case where a glossy vinyl chloride film is used, the test pattern (1) is selected in S1106.

Meanwhile, on coated paper having a relatively high absorbency, ejected ink is absorbed easily compared to a glossy vinyl chloride film, thus producing less smearing. Thus, there is a small difference in the degree of smearing which is dependent on how much the ejection regions Sr1 of the reaction liquid overlap with the ejection regions Si1 of the color inks of the first pattern 62; therefore, the length of the contact portions between the color inks needs to be long in order to measure the influence by this difference properly. In FIG. 12B, the test pattern (5) having the longest length of the contact portions of the color inks 1, 2 because the Y-direction length of the regions where the color inks 1, 2 are ejected is set to be the shortest exhibits an optical property having sufficient differences in optical density among the patterns. Thus, in a case where coated paper is used, the test pattern (5) is selected in S1106.

Referring back to FIG. 11, after selecting a test pattern 72 in S1106, next, the CPU 102 obtains a displacement amount of the relative ejection positions of the reaction liquid from the ejection positions of the color inks based on the optical property of the test pattern 72 selected (S1108), and ends the obtaining processing. In S1108, for example, the displacement amount can be obtained using fitted curves. In this way, in the present embodiment, the control part 100 including the CPU 102 functions as an obtaining part that obtains a displacement amount of the relative ejection positions of the reaction liquid from the ejection positions of the inks based on the optical property of the test pattern 72.

After thus obtaining the displacement amount of the relative ejection positions of the reaction liquid from the ejection positions of the color inks, the control part 100 calculates a correction value for making the relative ejection positions of the reaction liquid coincide with the ejection positions of the color inks. For example, a correction value for correcting the timing of ejecting the reaction liquid is calculated based on the obtained displacement amount of the ejection positions of the reaction liquid. Then, in the printing processing to perform printing on a print medium, the control part 100 performs printing by causing the printhead 24 to eject the reaction liquid at timings corrected using the calculated correction value. In this way, in the present embodiment, the control part 100 functions as a correction value obtaining part that obtains, based on the displacement amount obtained, a correction value for correcting the timing of ejecting the reaction liquid.

As thus described, in order to obtain a displacement amount of the relative ejection positions of the reaction liquid from the ejection positions of the color inks, the printing apparatus 10 prints a plurality of test patterns with different print conditions. Then, the optical properties of the plurality of test patterns are detected, and a test pattern is selected which exhibits an optical property such that its patterns have certain differences or more in optical density and that the lowest optical density value can be obtained. Then, the displacement amount is obtained based on the optical property of this test pattern. As a result, a test pattern exhibiting a proper optical property can be selected according to the absorbency of the print medium. Thus, a displacement amount of the relative ejection positions of the reaction liquid from the ejection positions of inks can be accurately obtained for various print media with different absorbencies.

Second Embodiment

Figure 13:
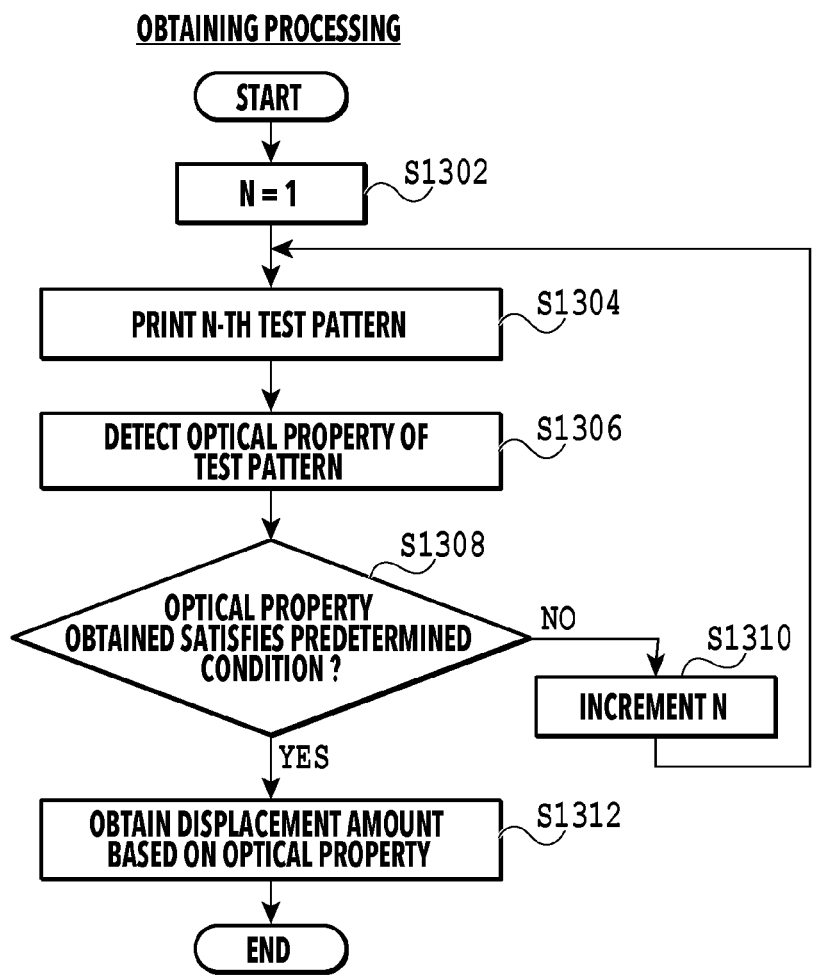
FIG. 13 is a flowchart of obtaining processing executed by a printing apparatus of another embodiment.

Next, with reference to FIG. 13, a printing apparatus of a second embodiment is described. In the following description, a configuration which is the same as or equivalent to a configuration in the printing apparatus of the first embodiment is denoted by the same reference numeral as that used in the first embodiment to omit a detailed description.

The second embodiment differs from the first embodiment in executing printing and optical property detection on test patterns with different print conditions sequentially one by one. Depending on the type of the print medium or the order of the test patterns, this eliminates the need to print all the test patterns with different conditions, and thus, a displacement amount of the relative ejection positions of the reaction liquid from the ejection positions of the color inks can be obtained efficiently.

In the printing apparatus 10 of the present embodiment, a plurality of test patterns 72 with different print conditions are stored in the memory 108. These test patterns 72 are assigned with, for example, serial numbers. Note that information assigned to the test patterns 72 is not limited to serial numbers, and any information such as information with which the test patterns 72 are identifiable may be used as long as the information is identification information with which the test patterns 72 can be obtained sequentially.

FIG. 13 is a flowchart showing a detailed processing routine for the obtaining processing executed by the printing apparatus of the present embodiment. Once the obtaining processing is started, first, the CPU 102 sets a variable N indicating the number assigned to a test pattern to "1" (S1302) and prints the N-th test pattern of the test patterns stored in the memory 108 (S1304). Next, the CPU 102 detects the optical property of the N-th test pattern thus printed (S1306). The specific processing performed in S1306 is the same as that performed in S1104 described earlier.

After that, the CPU 102 determines whether the detected optical property satisfies a predetermined condition (S1308). The predetermined condition is that a difference in optical density between adjacent ones of the patterns is greater than a predetermined value and that a pattern with an optical density of the lowest level can be identified as a significant difference. If it is determined in S1308 that the predetermined condition is not satisfied, the CPU 102 increments the variable N (S1310) and proceeds back to S1304. Meanwhile, if it is determined in S1308 that the predetermined condition is satisfied, the CPU 102 obtains, based on the optical property determined as satisfying the predetermined condition, a displacement amount of the relative ejection positions of the reaction liquid from the ejection positions of the color inks (S1312), and ends the obtaining processing. The specific processing performed in S1312 is the same as that performed in S1108 described earlier. Note that in a case where the identification information allocated to the test patterns 72 is not serial numbers, a particular one of pieces of identification information assigned to the test patterns 72 is set in S1302, and the test pattern 72 assigned with the identification information is printed in S1304. Then, in S1310, identification information which has not been set is set.

As thus described, the printing apparatus 10 of the present embodiment prints one test pattern and detects its optical property. Then, in a case where the detected optical property does not satisfy the predetermined condition, a different test pattern is printed, and in a case where the detected optical property satisfies the predetermined condition, a displacement amount of the ejection positions of the reaction liquid is obtained based on the optical property.

Thus, in addition to offering advantageous effects similar to those offered by the first embodiment, the present embodiment can obtain a displacement amount of the ejection positions of the reaction liquid efficiently. Specifically, in a case where a glossy vinyl chloride film is used as a print medium, the optical property of the first test pattern (1) satisfies the predetermined condition. Thus, a displacement amount of the ejection positions of the reaction liquid can be obtained without having to print the rest of the test patterns.

Third Embodiment

Figure 14:
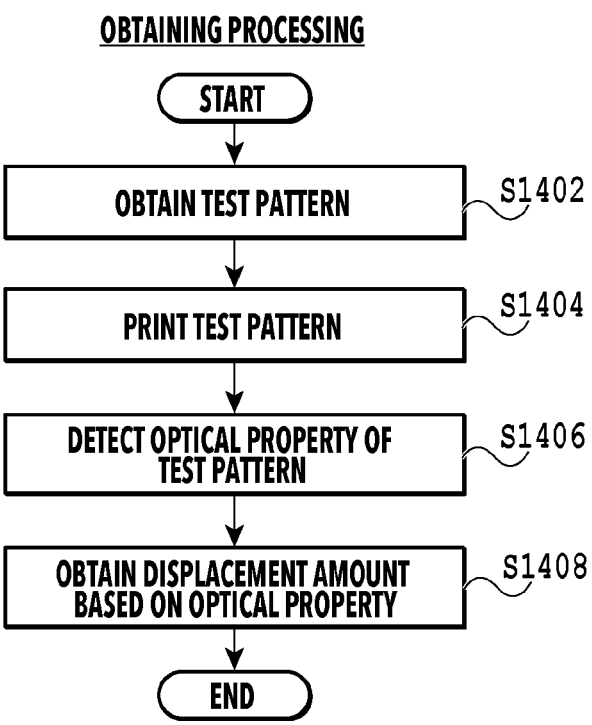
FIG. 14 a flowchart of obtaining processing executed by a printing apparatus of yet another embodiment.

Next, with reference to FIG. 14, a printing apparatus of a third embodiment is described. In the following description, a configuration which is the same as or equivalent to a configuration in the printing apparatus of the first embodiment is denoted by the same reference numeral as that used in the first embodiment to omit a detailed description.

The third embodiment differs from the first embodiment in that a test pattern determined by the type of a print medium corresponding to a print mode to execute is used in the obtaining processing. The kinds of test patterns to print are thereby narrowed down, and thus, a displacement amount of the relative ejection positions of the reaction liquid from the ejection positions of the color inks can be obtained even more efficiently.

In the printing apparatus 10 of the present embodiment, print modes executable by the printing apparatus 10 and a plurality of test patterns 72 with different print conditions are stored in the memory 108. Various conditions are set for each print mode so that printing may be performed appropriately depending on the type of print medium. Then, each type of print media in the print modes is associated with a test pattern 72. A test pattern 72 associated with a certain print medium is a test pattern which, by being printed on the print medium, allows a displacement amount of the ejection positions of the reaction liquid to be obtained based on the optical property thereof. The relation between a print medium and a test pattern 72 is found empirically. Specifically, a plurality of test patterns 72 with different print conditions are printed on a print medium, and their optical properties are detected. Then, a test pattern 72 exhibiting an optical property suitable for obtaining a displacement amount of the ejection positions of the reaction liquid among the optical properties detected, i.e., a test pattern 72 that satisfies a predetermined condition, is selected, and the test pattern 72 thus selected is associated with the print medium. The predetermined condition is that adjacent ones of the patterns have an optical density difference of greater than a predetermined value and that a pattern with an optical density of the lowest level can be identified as a significant difference.

For instance, to select a test pattern to be associated with a glossy vinyl chloride film, first, as shown in FIG. 10C, five test patterns (1) to (5) are printed, which have different Y-direction lengths of the regions where the color inks 1, 2 are ejected in the first pattern 62. Then, their optical properties are detected. The optical properties detected are as shown in FIG. 12A. Thus, the test pattern (1) satisfying the predetermined condition is selected and is stored in association with a glossy vinyl chloride film. Similarly, as to a test pattern to be associated with coated paper, the optical properties detected are as shown in FIG. 12B, and therefore the test pattern (5) is selected and is stored in association with coated paper.

FIG. 14 is a flowchart showing a detailed processing routine for the obtaining processing executed by the printing apparatus of the present embodiment. Once the obtaining processing is started, first, the CPU 102 obtains a test pattern 72 to print (S1402). In S1402, a print mode to be executed in the print processing is obtained, and a test pattern associated with a print medium to be printed by the print mode is obtained. Next, the CPU 102 prints the test pattern obtained (S1404), and detects the optical property of the printed test pattern (S1406). The specific processing performed in S1406 is the same as that performed in S1104 described earlier. After that, based on the optical property detected, the CPU 102 obtains a displacement amount of the relative ejection positions of the reaction liquid from the ejection positions of the color inks (S1408), and ends the obtaining processing. The specific processing performed in S1408 is the same as that performed in S1108 described earlier.

As thus described, the printing apparatus 10 of the present embodiment associates a test pattern suitable for obtaining a displacement amount of the ejection positions of the reaction liquid with a print medium corresponding to a print mode. Then, in the obtaining processing, the printing apparatus 10 prints a test pattern associated with a print medium corresponding to a print mode to execute and obtains a displacement amount of the ejection positions of the reaction liquid based on the optical property of the test pattern. Thus, in addition to offering advantageous effects similar to those offered by the first embodiment, the present embodiment can obtain a displacement amount of the ejection positions of the reaction liquid even more efficiently.

Fourth Embodiment

Figure 15:
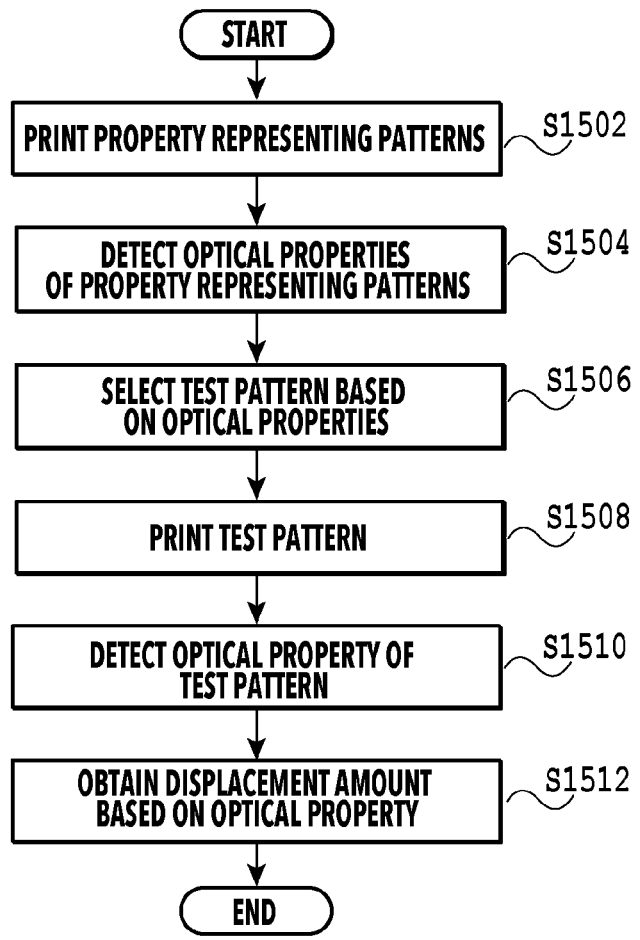
FIG. 15 a flowchart of obtaining processing executed by a printing apparatus of still another embodiment.

Next, with reference to FIG. 15, a printing apparatus of a fourth embodiment is described. In the following description, a configuration which is the same as or equivalent to a configuration in the printing apparatus of the first embodiment described above is denoted by the same reference numeral as that used in the first embodiment to omit a detailed description.

The fourth embodiment differs from the first embodiment in selecting a test pattern suitable for a print medium by use of a property representing pattern that exhibits the absorbency of a print medium and then using the test pattern to obtain a displacement amount of the ejection positions of the reaction liquid. The kinds of test patterns to print are thereby narrowed down, and thus, a displacement amount of the relative ejection positions of the reaction liquid from the ejection positions of the color inks can be obtained efficiently.

In the printing apparatus 10 of the present embodiment, a property representing pattern that exhibits the absorbency of a print medium is stored in the memory 108 in addition to the plurality of test patterns with different print condition. As the property representing pattern, patterns formed by two different color inks are used, and for example, a plurality of first patterns 62 with different print conditions are used. The print condition is at least one of the "ejection amount of the color inks" and the "Y-direction length of the regions where the color inks 1, 2 are ejected." Specifically, the property representing patterns are patterns obtained by varying the print condition(s) of the first pattern 62 as shown in FIGS. 10A and 10C, and the reaction liquid is not used in the present embodiment.

FIG. 15 is a flowchart showing a detailed processing routine for the obtaining processing executed by the printing apparatus of the present embodiment. Once the obtaining processing is started, first, the CPU 102 prints a property representing pattern (S1502). In S1502, for example, five patterns with different Y-direction lengths of the regions S-1, S-2 where the color inks 1, 2 are ejected are printed. Then, the optical property of the printed property representing pattern is detected (S1504), and based on the detected optical property, a test pattern suitable for obtaining a displacement amount of the ejection positions of the reaction liquid on the print medium is selected (S1506).

In S1506, for example, in a case where there is a large degree of smearing between the color inks 1, 2 as shown in FIG. 8B, a test pattern with a long Y-direction length of the regions S-1, S-2 where the color inks 1, 2 are ejected is selected. Meanwhile, in a case where there is a small degree of smearing as shown in FIG. 8A, a test pattern with a small Y-direction length is selected. Note that in a case where five patterns with different ejection amounts of color inks are printed in S1502 and there is a large degree of bleeding, a test pattern with a small ejection amount of the color inks is selected in S1506. Meanwhile, in a case where there is a small degree of bleeding, a test pattern with a large ejection amount of the color inks is selected. Information is stored in the memory 108, the information indicating an association between an optical property of a property representing pattern and a test pattern 72 from which a displacement amount of the ejection positions of the reaction liquid can be properly obtained in a case where the optical property is exhibited. In S1506, the CPU 102 selects a test pattern 72 based on this information. For example, such information is found and created empirically.

After that, the CPU 102 prints the selected test pattern (S1508), and detects the optical property of the printed test pattern (S1510). The specific processing performed in S1510 is the same as that performed in S1104 described earlier. After that, based on the optical property detected, the CPU 102 obtains a displacement amount of the relative ejection positions of the reaction liquid from the ejection positions of the color inks (S1512), and ends the obtaining processing. Specific processing performed in S1512 is the same as that performed in S1108 described earlier.

As thus described, the printing apparatus 10 of the present embodiment prints property representing patterns, and based on their optical properties, a test pattern 72 suitable for obtaining a displacement amount of the ejection positions of the reaction liquid on the print medium is obtained. Then, in the obtaining processing, a displacement amount of the ejection positions of the reaction liquid is obtained based on the optical property of this test pattern 72. Thus, in addition to offering advantageous effects similar to those offered by the first embodiment, the present embodiment can obtain a displacement amount of the ejection positions of the reaction liquid even more efficiently.

Other Embodiments

Note that the embodiments described above may be modified as shown in (1) to (5) below.

(1) The reaction liquid containing no color material is used above, but the reaction liquid may contain a color material as long as it does not affect the image quality, although such a statement is not made in the embodiments described above. Also, although not particularly stated in the above embodiments, the printhead 24 may employ any of various publicly-known ink ejection methods, such as what is called a thermal method in which ink is ejected using electrothermal conversion elements or what is called a piezoelectric method in which ink is ejected using piezoelectric elements.

(2) Although the control part 100 of the printing apparatus executes the obtaining processing and calculates a correction value based on the obtained displacement amount in the above embodiments, the present invention is not limited to this. For example, an apparatus provided separately from the printing apparatus 10, such as the host apparatus 114, may control the printing apparatus 10 to execute the obtaining processing and calculate the correction value for correcting the timing of ejecting the reaction liquid based on the displacement amount obtained by the obtaining processing. Alternatively, one of the obtainment of a displacement amount and the calculation of a correction value may be executed by an apparatus provided separately from the printing apparatus 10. Also, although a correction value for correcting the timing of ejecting the reaction liquid is obtained based on the displacement amount obtained by the obtaining processing in the above embodiments, the present invention is not limited to this, and may obtain a correction value for correcting the timing of ejecting the inks instead. Alternatively, both of a correction value for correcting the timing of ejecting the reaction liquid and a correction value for correcting the timing of ejecting the inks may be obtained.

(3) Although not particularly stated in the third embodiment, one or more test patterns are associated with each print medium. In a case where a plurality of test patterns are associated with a print medium, the test patterns are assigned with, for example, serial numbers, as in the second embodiment. Then, the printing, the optical property detection, and the optical property determination are performed on the test patterns sequentially to select a test pattern suitable for obtaining a displacement amount of the ejection positions of the reaction liquid. Also, although a print medium corresponding to a print mode is associated with a test pattern suitable for the print medium in the third embodiment, the present invention is not limited to this. Specifically, irrespective of corresponding to a print mode, all the print media usable in the printing apparatus 10 may be associated with a test pattern suitable for obtaining a displacement amount of the ejection positions of the reaction liquid.

(4) Although only a pattern using color inks is used as a property representing pattern in the fourth embodiment, the present disclosure is not limited to this. For example, the pattern may be formed by superimposition of the pattern using the reaction liquid in FIG. 6B over the pattern using the color inks in FIG. 6A. Alternatively, both of a pattern using color inks and a pattern formed by superimposition of a pattern using the reaction liquid over a pattern using color inks may be used. Note that in a case of using a pattern formed by superimposition of a pattern using the reaction liquid over a pattern using color inks, the printing may be performed with the ejection amount of reaction liquid changed as a print condition.

(5) The embodiments described above and various modes shown in (1) to (4) may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-092145, filed Jun. 1, 2021, which is hereby incorporated by reference wherein in its entirety.

What is claimed is:

1. A printing apparatus comprising:
   a print unit configured to print an image on a print medium by ejecting, to the print medium, a plurality of inks different from one another and a reaction liquid that reacts with the inks to promote solidification of the inks;
   a detection unit configured to be able to detect an optical density of a printed product obtained by the printing of the image on the print medium; and
   an obtainment unit configured to obtain a displacement amount of relative ejection positions of the reaction liquid from ejection positions of the plurality of inks, wherein
   the print unit prints a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time,
   the detection unit detects optical properties of the plurality of test patterns printed on the print medium, and
   the obtainment unit obtains the displacement amount based on the optical property of the test pattern in which an optical density difference between the patterns in the test pattern is greater than a predetermined value and which has an optical density of a lowest level among the optical properties of the plurality of test patterns detected by the detection unit.

2. The printing apparatus according to claim 1, wherein the print unit performs printing on the print medium while moving in a first direction,
   each of the patterns forming each of the test patterns is formed by a first pattern by the two inks and a second pattern by the reaction liquid,
   in the first pattern, an ejection region where the two inks are ejected and a non-ejection region where the two inks are not ejected are arranged alternately in the first direction, the ejection region having a third region where one of the two inks is ejected and a fourth region where a different one of the two inks is ejected arranged alternately in a second direction intersecting with the first direction,
   in the second pattern, an ejection region where the reaction liquid is ejected and a non-ejection region where the reaction liquid is not ejected are arranged alternately in the first direction, and
   in each of the test patterns, the patterns forming the test pattern are such that
      between the patterns in the test pattern, the second pattern is displaced from the first pattern in the first direction by the predetermined amount, and
      an amount by which the second pattern is displaced from the first pattern is different from one another.

3. The printing apparatus according to claim 2, wherein the predetermined amount corresponds to one pixel.

4. The printing apparatus according to claim 2, wherein the print condition is at least one of an ejection amount of the two inks, an ejection amount of the reaction liquid, and a length of the third region and the fourth region in the second direction.

5. The printing apparatus according to claim 4, wherein a diameter of a detection range of the detection unit is between 0.1 mm and 5 mm, both inclusive.

6. The printing apparatus according to claim 5, wherein a number of contact portions between the third region and the fourth region that are included in the detection range is between 1 and 30,000, both inclusive.

7. The printing apparatus according to claim 5, wherein a length of contact portions between the third region and the fourth region that are included in the detection range is between 0.02 mm and 600 mm, both inclusive.

8. The printing apparatus according to claim 5, wherein a length of the third region and the fourth region in the second direction included in the detection range is between 0.01 mm and 2.5 mm, both inclusive.

9. The printing apparatus according to claim 4, wherein the ejection amount of the two inks is between 10 ng/600 dpi and 50 ng/600 dpi, both inclusive.

10. The printing apparatus according to claim 4, wherein the ejection amount of the reaction liquid is between 0 ng/600 dpi and 50 ng/600 dpi, both inclusive.

11. The printing apparatus according to claim 1, further comprising a correction value obtainment unit configured to obtain, based on the displacement amount, a correction value for correcting timing of ejecting the plurality of inks or the reaction liquid.

12. The printing apparatus according to claim 1, wherein the print medium is non-absorbent or poorly-absorbent.

13. The printing apparatus according to claim 1, wherein the two inks are of a combination that makes the optical density detected by the detection unit different depending on whether the two inks smear to a large degree or do not smear.

14. A printing apparatus comprising:
a print unit configured to print an image on a print medium by ejecting, to the print medium, a plurality of inks different from one another and a reaction liquid that reacts with the inks to promote solidification of the inks;
a detection unit configured to be able to detect an optical density of a printed product obtained by the printing of the image on the print medium; and
an obtainment unit configured to obtain a displacement amount of relative ejection positions of the reaction liquid from ejection positions of the plurality of inks, wherein
the print unit prints one of a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time,
the detection unit detects an optical property of the test pattern printed on the print medium,
in a case where the optical property of the test pattern detected by the detection unit indicates that an optical density difference between the patterns in the test pattern is greater than a predetermined value and that the test pattern has an optical density of a lowest level, the obtainment unit obtains the displacement amount based on the optical property, and
in a case where the optical property of the test pattern detected by the detection unit does not indicate that the optical density difference between the patterns in the test pattern is greater than the predetermined value and that the test pattern has an optical density of a lowest level,
the print unit prints one of the plurality of test patterns which is yet to be printed, and
the detection unit detects an optical property of the test pattern printed.

15. A printing apparatus comprising:
a print unit configured to print an image on a print medium by ejecting, to the print medium, a plurality of inks different from one another and a reaction liquid that reacts with the inks to promote solidification of the inks;
a detection unit configured to be able to detect an optical density of a printed product obtained by the printing of the image on the print medium; and
an obtainment unit configured to obtain a displacement amount of relative ejection positions of the reaction liquid from ejection positions of the plurality of inks, wherein
the print unit prints one of a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time, the one test pattern being associated with the print medium to be printed and indicating that, in a case where the test pattern is printed, an optical density difference between the patterns in the test pattern is greater than a predetermined value and that the test pattern has an optical density of a lowest level,
the detection unit detects an optical property of the test pattern printed on the print medium, and
the obtainment unit obtains the displacement amount based on the optical property of the test pattern detected by the detection unit.

16. A printing apparatus comprising:
a print unit configured to print an image on a print medium by ejecting, to the print medium, a plurality of inks different from one another and a reaction liquid that reacts with the inks to promote solidification of the inks;
a detection unit configured to be able to detect an optical density of a printed product obtained by the printing of the image on the print medium; and
an obtainment unit configured to obtain a displacement amount of relative ejection positions of the reaction liquid from ejection positions of the plurality of inks, wherein
the print unit is capable of printing a plurality of test patterns with different print conditions and a plurality of property representing patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time, the property representing patterns each including a plurality of patterns that use at least the two inks of the two inks and the reaction liquid and representing a property of the print medium,
the print unit prints one of the plurality of test patterns with the different print conditions, the one test pattern being selected based on optical properties of the plurality of printed property representing patterns different from one another that are detected by the detection unit, the one test pattern indicating that, in a case where the test pattern is printed, an optical density difference between the patterns in the test pattern is greater than a predetermined value and that the test pattern has an optical density of a lowest level, and
the obtainment unit obtains the displacement amount based on an optical property of the test pattern detected by the detection unit.

17. The printing apparatus according to claim 16, wherein the print unit performs printing on the print medium while moving in a first direction,
in each of the property representing patterns, an ejection region where the two inks are ejected and a non-ejection region where the two inks are not ejected are arranged alternately in the first direction, and in the ejection region, a first region where one of the two inks is ejected and a second region where a different one of the two inks is ejected are arranged alternately in a second direction intersecting with the first direction.

18. The printing apparatus according to claim 17, wherein the plurality of property representing patterns are different from one another in at least one of an ejection amount of the two inks and a length of the first region and the second region in the second direction.

19. A method for controlling a printing apparatus including a print unit configured to print an image on a print medium by ejecting, to the print medium, a plurality of inks different from one another and a reaction liquid that reacts with the inks to promote solidification of the inks, and a detection unit configured to be able to detect an optical property of a printed product obtained by the printing of the image on the print medium, the method comprising:

causing the print unit to print a plurality of test patterns with different print conditions, the test patterns each being formed by two inks out of the plurality of inks and the reaction liquid and each including a plurality of patterns among which ejection positions of the reaction liquid relative to ejection positions of the two inks are displaced by a predetermined amount at a time;

causing the detection unit to detect optical properties of the respective test patterns printed; and obtaining a displacement amount of relative ejection positions of the reaction liquid from ejection positions of the plurality of inks based on the optical property of the test pattern in which an optical density difference between the patterns in the test pattern is greater than a predetermined value and which has an optical density of a lowest level among the optical properties of the plurality of test patterns detected.

* * * * *